(12) United States Patent
Balogh

(10) Patent No.: US 7,543,497 B2
(45) Date of Patent: Jun. 9, 2009

(54) ELECTRODYNAMIC ACCELEROMETER

(75) Inventor: W. Thomas Balogh, Houston, TX (US)

(73) Assignee: MicroTesla, Ltd., Houston, TX (US)

( * ) Notice: Subject to any disclaimer, the term of this patent is extended or adjusted under 35 U.S.C. 154(b) by 117 days.

(21) Appl. No.: 11/518,542

(22) Filed: Sep. 8, 2006

(65) Prior Publication Data

US 2007/0028688 A1 Feb. 8, 2007

Related U.S. Application Data

(63) Continuation-in-part of application No. 10/953,330, filed on Sep. 29, 2004, now abandoned.

(51) Int. Cl.
*G01P 15/125* (2006.01)
(52) U.S. Cl. .................. 73/514.09; 73/514.06
(58) Field of Classification Search ............. 73/514.05, 73/514.06, 514.08, 514.09, 514.32; 324/663
See application file for complete search history.

(56) References Cited

U.S. PATENT DOCUMENTS

| | | | | |
|---|---|---|---|---|
| 3,309,930 A | * | 3/1967 | Jones ...................... | 73/514.09 |
| 3,516,294 A | * | 6/1970 | Schmieder ............... | 73/514.08 |
| 4,661,451 A | * | 4/1987 | Hansen ..................... | 435/174 |
| 4,676,103 A | * | 6/1987 | Nakajima ................ | 73/514.09 |
| 2002/0118005 A1 | * | 8/2002 | Reich et al. ............... | 324/71.4 |

* cited by examiner

*Primary Examiner*—John E Chapman
(74) *Attorney, Agent, or Firm*—Williams, Morgan & Amerson, P.C.

(57) ABSTRACT

An apparatus includes: a fluid container; a fluid mixture disposed within the fluid container, the fluid mixture including at least two components having different relative dielectric constants or different relative permeabilities; an imparter for imparting an electrostatic or electromagnetic force across the fluid mixture to cause at least one of the components to be placed in motion; and a controller for controlling the electrostatic or electromagnetic force to counteract the effects of an applied acceleration. A method includes positioning a high dielectric or high permeability element suspended in a low dielectric or low permeability fluid contained between a pair of charged electrode plates or a magnetic gap; determining a change in capacitance or inductance of the apparatus; and determining from the capacitance change or inductance change a magnitude of the acceleration.

33 Claims, 13 Drawing Sheets

ELECTRODYNAMIC ACCELEROMETER

This is a continuation-in-part of U.S. application Ser. No. 10/953,330, entitled, "DIELECTRIC ACCELEROMETER, filed Sep. 29, 2004 now abandoned, in the name of the inventor W. Thomas Balogh.

BACKGROUND OF THE INVENTION

1. Field of the Invention

The present invention pertains to accelerometers and, more particularly, to electrodynamic accelerometers including electric field and electromagnetic devices.

2. Description of the Related Art

To date, in most applications, tilt or inclination is usually measured using one of two primary types of sensors. The first type involves the use of bubble type tilt sensors in which a lighter specific gravity fluid, sometimes air, is floated upon a heavier specific gravity fluid. If these two fluids exhibit different electrical parameters, the location of the fluid interface relative to a fixed point on the sensor can be measured electrically and the resultant electrical output can be indicative of the tilt of the sensor. The other primary type of sensor used to measure inclination is an "accelerometer." Most accelerometers use a proof mass to measure the force required to keep the mass in a fixed or nearly fixed position. These accelerometers are generally only sensitive to acceleration in one axis.

Thus, accelerometers are often used for the measurement of acceleration and deceleration in a variety of applications. Some of the most notable are automotive applications where acceleration measurements are used to initialize deployment of an air bag in the event of sudden deceleration. In these applications, the acceleration range can be on the order of ±50 Gs peak. However, some applications call for measurements on a much smaller scale, which are difficult to make accurately with these types of accelerometers. Consider, for instance, applications where the acceleration of gravity is the measured parameter and the desired result is the determination of tilt or inclination of a measurement platform relative to vertical. In these applications, the nominal acceleration range is on the order of ±1 G and the required resolution of the sensor can be on the order of a few milli-Gs.

Accelerometers can be designed as either open-loop or closed-loop. In an open-loop accelerometer, the proof mass is suspended from a reference point generally using some type of spring. Either the deflection of the proof mass relative to the reference point or the spring stress is measured and indicative of the acceleration. Closed loop accelerometers are similar to open-loop designs in that they use a suspended proof mass and they have a means to measure the deflection of the proof mass when acceleration is applied. Closed loop accelerometers differ from open-loop designs in that they have a means by which a force can be applied to the proof mass to oppose the acceleration forces and maintain the proof mass in a nearly fixed position. The force required to maintain the proof mass in the nearly fixed position is indicative of the acceleration.

Consider the test fixture 100 in FIG. 1. If a solid dielectric plate 103 is placed between two electrode plates 106, and a voltage is applied to the electrode plates 106, a force, $F_c$, will be exerted on the dielectric plate 103. The force $F_c$ will tend to center the dielectric plate 103 between the electrode plates 106 as shown in ghosted lines 109. This centering force, $F_c$ can be determined. In this example, the dielectric plate 103 is assumed to have a relative dielectric of K; and, the relative dielectric of the void space surrounding the plate is assumed to be that of free space $e_0$, or 1. A voltage, $V_S$, is applied to the plates. The lengths, L, of the electrode plates 106 and dielectric plate 103 are equal. The electrode plates 106 have a width of b (dimension not shown). The electrode plates 106 are separated by a distance, d. The thickness of the dielectric plate 103 is slightly less than the plate separation distance, d. The centering force, $F_C$, is defined as:

$$F_C = \frac{V_s^2 e_0 b}{2d}(K-1) \quad (1)$$

where
$V_S$=voltage applied to the plates;
$e_0$=permittivity of free space;
b=width of the plates;
d=spacing between the plates; and
K=relative dielectric constant of the dielectric plate.

As an example, the voltage applied to the apparatus and the relative dielectric of the dielectric plate 103 are assumed to be as follows:
$V_S$=30 V (or J/coulomb);
$e_0$=8.85E-12 coulomb$^2$/N-m$^2$;
b=0.1 inch (or 0.00254 m);
d=0.01 inch (or 0.000254 m); and
K=500.

The centering force $F_c$ is then calculated to be:

$$F_C = 1.99\text{E-}05 \text{ Newton} \quad (2)$$

The capacitance measured between the plates is defined as:

$$C = \frac{e_0 b L}{D} K \quad (3)$$

Assume now that $K_1$ is defined as the initial relative dielectric constant of the region between the electrode plates 106. In the previous example, $K_1$ was defined to be the relative dielectric of free space $e_0$, or 1. $C_1$ is defined as the initial capacitance measured between the electrode plates 106. $K_2$ is defined as the relative dielectric of the dielectric plate 103. $C_2$ is defined as the new capacitance measured when the dielectric plate 103 is fully centered. Eq. (1) can now be rewritten to a form which describes the centering force as a function of the capacitance change as follows:

$$F_C = \frac{V_s^2}{2L}(C_2 - C_1) \quad (4)$$

The present invention is directed to resolving, or at least reducing, one or all of the problems mentioned above.

SUMMARY OF THE INVENTION

The invention includes, in its various embodiments and aspects, an apparatus and a method for measuring acceleration. An apparatus, comprising: a fluid container; a fluid mixture disposed within the fluid container, the fluid mixture including at least two components having different relative dielectrics or different permeabilities; means for imparting an electrostatic or electromagnetic force across the fluid mixture to cause at least one of the components to be placed in motion; and means for controlling the electrostatic or electromagnetic force to counteract the effects of an applied acceleration. The method comprises positioning a high dielectric or high permeability element suspended in a low dielectric or low permeability fluid contained between a pair of charged electrode plates or between a magnetic gap; determining a change in capacitance or inductance across the charged electrode plates or magnetic gap as an acceleration is applied; and determining from the capacitance or inductance change a magnitude of the acceleration.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, the drawings illustrate specific embodiments herein described in detail by way of example. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Figure 1:
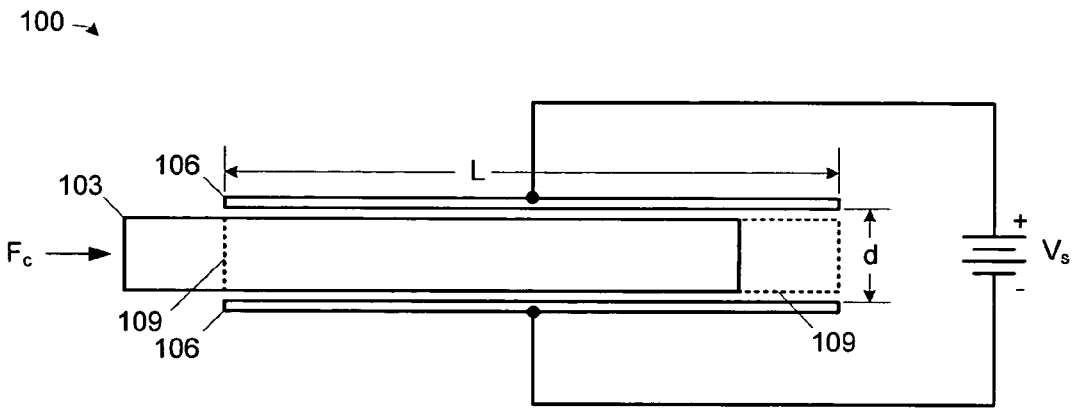
FIG. 1 is a block diagram of a conventional test fixture.
Figure 2:
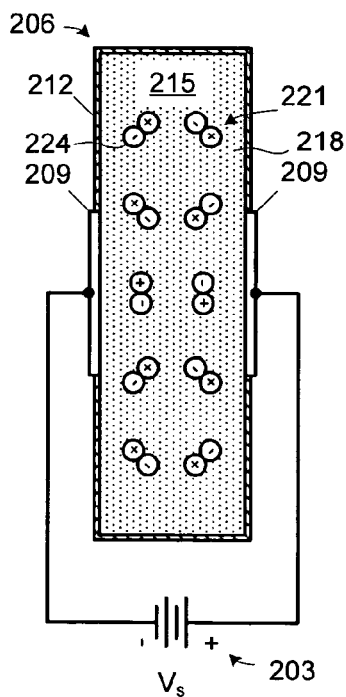
FIG. 2 is a block diagram of one particular embodiment of demonstration test fixture.

FIG. 2 is a block diagram of one particular embodiment of fixture 200. The fixture 200 comprises a voltage source 203 electrically connected to a fixture 206 as shown. The voltage source 203 may be implemented using any conventional design known to the art. More particularly, the voltage source 203 is electrically connected in parallel across the electrode plates 209 of the fixture 206. The fixture 206 further comprises a fluid container 212 defining a fluid chamber 215 in which a non-conducting, low dielectric fluid 218 is disposed. The fluid 218 should have a dielectric constant as low as is practically achievable, and preferably of 1. A high dielectric element 221 is suspended in the fluid 218.

The fluid 218 fills most of the fluid chamber 215 and has a relative dielectric of nearly 1. A minimum to no ullage (not shown) is desirable, but some ullage may be tolerated provided it does not interfere with the operation of the invention. Exemplary fluids include, but are not limited to, alcohol and silicone oil, for example. The fluid 218 may also be a gas rather than a liquid in some embodiments. The dielectric element 221 may be distributed or unitary, fluid (i.e., liquid or gas) or solid, and has a high relative dielectric much greater than 1. In the embodiment of FIG. 2, the dielectric element 221 is distributed (e.g., a plurality of ceramic beads), as represented by the electric dipoles 224, only one of which is indicated. FIG. 2 shows the dielectric element 221 as electric dipoles randomly distributed in the fluid 218 as it might exist with no voltage applied to the electrode plates 209 and no acceleration applied to the fixture 200.

Figure 3:
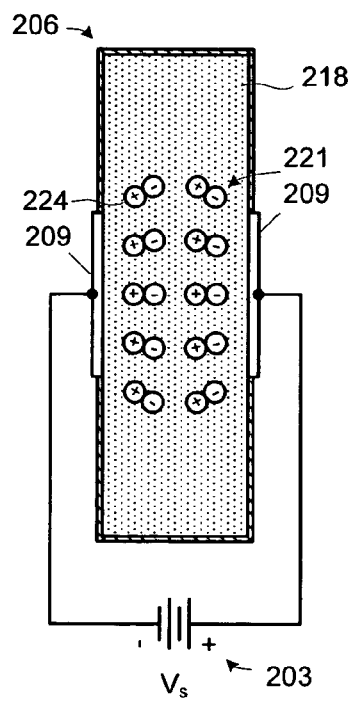
FIG. 3 illustrates the application of voltage across the fixture of FIG. 2 on a dielectric element suspended in the fluid thereof.
Figure 4:
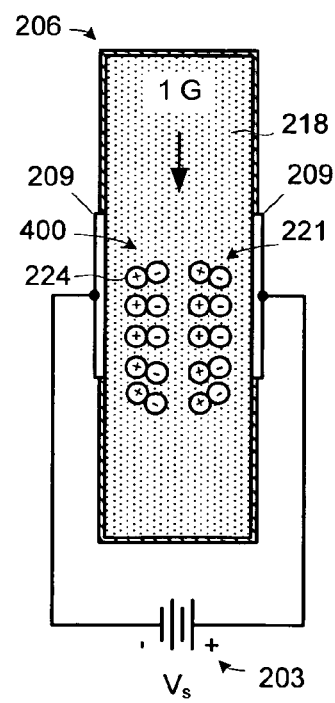
FIG. 4 illustrates the application of a +1 G acceleration on the fixture of FIG. 3.

In general, the concentration of the dipoles 224 between the electrode plates 209 affects the capacitance between the electrode plates 209 when the electrode plates 209 are charged by the voltage source 203. The dipoles 224 will be randomly distributed in the fluid 218, as shown in FIG. 2, as long as the electrode plates 209 remain uncharged and there is no acceleration. When the electrode plates 209 are charged, the dipoles 224 will concentrate in a position centered in the region between the charged electrode plates 209, as shown in FIG. 3. When an acceleration is applied, as shown in FIG. 4, this concentration of dipoles 224 will shift in the direction of the force exerted by the acceleration. Furthermore, the principle can be used in both open-loop and closed-loop designs, as will be discussed further below.

More technically, assume that the dielectric element 221 constitutes a small percentage of the total volume of the apparatus, $V_0$. Then:

$$v_1 = \frac{V_D}{V_0} = 3.33\% \tag{5}$$

where:
 $v_1$=the percentage of volume of the dielectric element 221;
 $V_0$=the total volume of the fluid chamber 212 in cm$^3$; and
 $V_D$=the volume of high dielectric material in the apparatus in cm$^3$.

The volume between the electrode plates, V, is defined as follows:

$$V = bdL \tag{6}$$

The total volume of the apparatus, $V_0$, is defined as follows:

$$V_0 = bdL_A \tag{7}$$

where $L_A$ is the length of the fluid chamber 212.

For present purposes, the dimensions of the accelerometer of FIG. 3 and the electrode plates will be assumed, as follows:
 b=0.010" (0.0254 cm);
 d=0.001" (0.0254 cm);
 L=0.001" (0.0254 cm);
 $L_A$=0.003" (0.0762 cm); and
 V=1.64E-07 cm$^3$;
 $V_A$=4.92E-07 cm$^3$ In this particular embodiment, the dielectric element 221 is implemented using a plurality of solid Barium Titanate beads manufactured by Ferro Electronic Materials and fabricated with the ×5000 material having a relative dielectric permittivity of 5,000 and other applicable parameters as follows:
 $K_R$=5000
 D=1.9 um
 W=5.8 g/cc At the above specified dielectric percentage, the volume of the dielectric element 221 is:

$V_D$=1.639E-8 cm$^3$

In this particular embodiment, the fluid 218 comprises alcohol with a density if 0.8 g/cc. Therefore considering the buoyant effects of the fluid 218 (i.e., the alcohol), the effective mass of the dielectric element 221 is as follows:

$m_D$=8.19E-08 grams

If a voltage, $V_S$, is applied across the electrode plates 209, the dielectric element 221 will be attracted to and pulled into the region between the plate electrode plates 209 as shown in FIG. 3. As depicted in this simplified drawing, the dipoles 224 will be concentrated between the electrode plates 209.

Because most of the dielectric element 221 will be concentrated between the electrode plates 209, the volume percentage of dielectric element 221 to low dielectric material, i.e., the fluid 218, between the electrode plates 209 will increase from v1 or 3.33% to the new value $v_2$ defined as:

$$v_2 = \frac{V_D}{V} = 10.0\% \tag{8}$$

Figure 5:
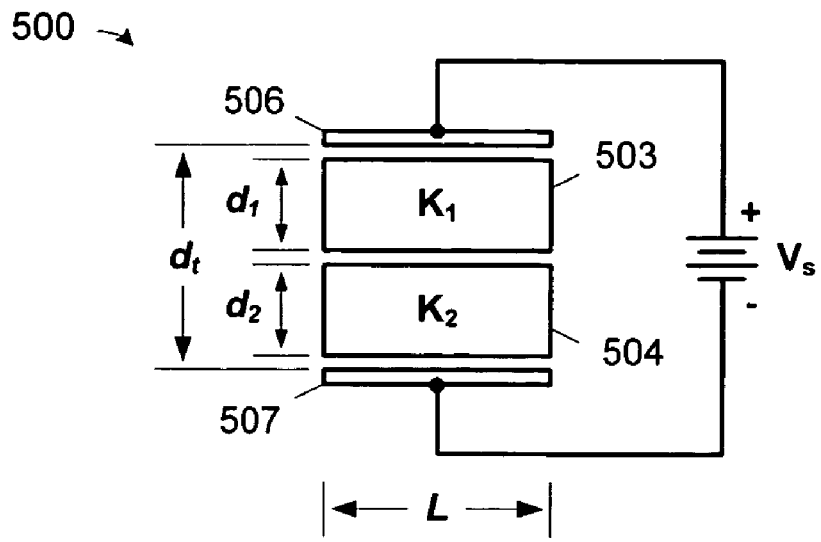
FIG. 5 depicts a fixture with two dielectric slabs.

Estimation of capacitance and dielectric constant will now be discussed. To estimate the capacitance and dielectric constant of the apparatus of FIG. 2 through FIG. 4 consider the computation of capacitance for the apparatus 500 presented in FIG. 5, a fixture with two dielectric slabs 503, 504. More particularly, the apparatus 500 in FIG. 5 is a capacitor formed of two dielectric slabs 503, 504 where the thickness, $d_1$ and $d_2$, of both slabs 503, 504 combined fills the separation, $d_f$, between the plates 506, 507. The capacitance, C, of this composite structure is defined is defined as:

$$C = \frac{A\varepsilon_0}{\frac{d_1}{K_1} + \frac{d_2}{K_2}}, \tag{9}$$

where:
 A=area of the plates (b×L);
 $\varepsilon_0$=permittivity of free space;
 $d_f$=spacing between the plates;
 $d_1$, $d_2$=thickness of the dielectric slabs; and
 $K_1$, $K_2$=relative dielectric constant of the dielectric plate.

Figure 6:
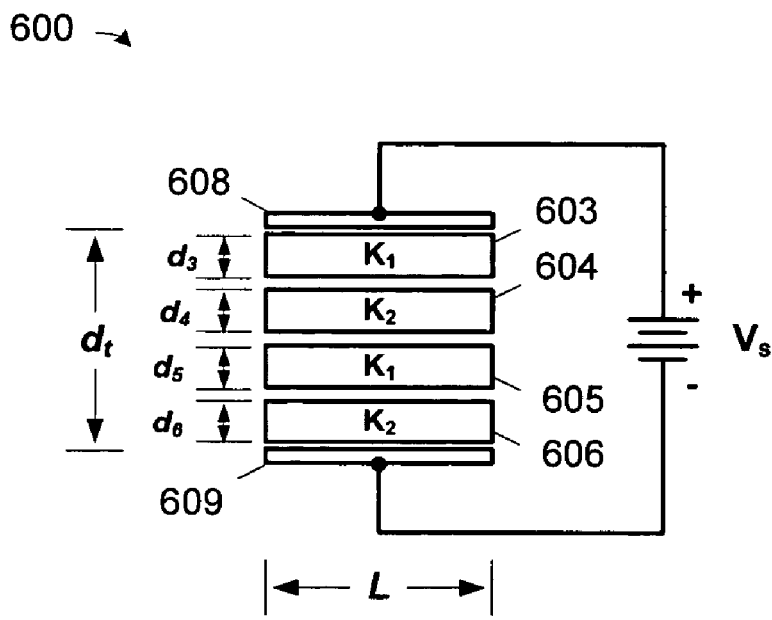
FIG. 6 depicts a composite structure that is a fixture with four dielectric slabs.

Now consider the composite structure 600 of FIG. 6, a fixture with four dielectric slabs 603-606, where the capacitor is formed using four dielectric slabs 603-606 where the thickness, $d_3$-$d_6$, of the slabs combines to fill the separation d, between the plates 608, 609. The capacitance C of this composite structure is defined:

$$C = \frac{A\varepsilon_0}{\frac{d_3}{K_1} + \frac{d_4}{K_2} + \frac{d_5}{K_1} + \frac{d_6}{K_2}} \tag{10}$$

If the combined thickness of the dielectric slabs in FIG. 6 are equal to those in FIG. 5, $d_1$=$d_3$+$d_5$ and $d_2$=$d_4$+$d_6$, then Eq. (10) will reduce to Eq. (9). Furthermore, any number of dielectric slabs 603-606 can be introduced into the structure 600. These dielectric slabs can be of various thicknesses and can be arranged in any order. As long as the combined thicknesses of the specific dielectrics remain the same, the result will be the same.

Now consider the above in light of the apparatus of FIG. 2-FIG. 4. The dielectric located between the plates can be viewed as high dielectric slabs interspaced in the low dielectric fluid between plates. Ignoring the effects of fringing, Eq. (9) can be used to estimate the capacitance and effective dielectric constant of this composite structure. Even though fringing can have a significant impact on the capacitance of the composite structure, it will tend to produce a higher capacitance for the case when the high dielectric particles are pulled between the plates; therefore, the force drawing the particles between the plates will actually be higher. By ignoring the fringing effects, the first order solution produced by the following is pessimistic result with optimization of the final design achieved empirically.

The effective dielectric constant of the region between the plates 510-513 of the apparatus 500 in FIG. 5 can be computed by combining Eq. (3) and Eq. (9) and simplifying to the following expression:

$$K_{eff} = \frac{d_t}{\frac{d_1}{K_1} + \frac{d_2}{K}}, \quad (11)$$

where:
- $K_{eff}$=the effective dielectric constant;
- $d_t$=spacing between the plates;
- $d_1$=the total effective thickness of the low dielectric material;
- $K_1$=relative dielectric constant of the low dielectric material;
- $d_2$=the total effective thickness of the high dielectric material;
- $K_2$=relative dielectric constant of the high dielectric material.

In the following, it is assumed that the low dielectric material is a fluid having a dielectric constant of nearly 1. It is also assumed that there are only two dielectric components therefore, $d_1=d_t-d_2$. Substituting and rearranging Eq (9) yields:

$$K_{eff} = \frac{1}{\frac{d_t-d_2}{d_t} + \frac{d_2}{d_t * K_2}} \quad (12)$$

The percentage of volume of the dielectric when all of the material is between the plates is given in Eq. (8) as $v_2$ and:

$$v_2 = \frac{d_2}{d_t} \quad (13)$$

For this apparatus, the volume percentage of high dielectric particles will never be greater than half the volume. It is also assumed that the dielectric constant, $K_2$, of the high dielectric particles is much greater than one. Therefore, Eq. (12) for the effective dielectric constant of the material between the plates simplifies to:

$$K_{eff} = \frac{1}{1-v_2} \quad (14)$$

Referring to Eq. (14), note that for the case where there is only low dielectric fluid between the plates, the volume percentage of the high dielectric material, $v_2$, equals zero and the effective dielectric constant becomes one. This equation further implies that, for very high relative dielectric particles at relatively low concentrations, the effective dielectric constant of the region between the plates is dominated by the volume percentage of the low dielectric material.

As the concentration of dielectric material between the electrode plates increases from $v_1$ to $v_2$, the relative dielectric in the region between the plates will also increase, where:

$K_1=1/(1-v_1)=1.034$ And $K_2=1/(1-v_2)=1.111$

Referring back to Eq. 3, the capacitance for the two conditions are calculated to be:

$C_1=0.00233$ pF And $C_2=0.00250$ pF

If $V_S$=30 Volts then the force holding the dipoles 224 between the electrode plates 209 is defined by Eq. 3 as:

$F_C=3.113$E-07 grams

Assuming the mass, $m_D$, is equivalent to a 1 G force, the fixture 200 can support a G-force of:

$G_F=3.80$ Gs

Thus, when the fixture 206 is exposed to a 1 G acceleration, the dipoles 224 will be concentrated and shifted to the edge of the electrode region 400 defined by the electrode plates 209, as is depicted in FIG. 4. Although this will tend to increase the concentration of dielectric element 221, this concentration will occur over a smaller electrode area. Consequently, the net relative dielectric will remain essentially the same and the forces will remain the same. In this example, the dipoles 224 will remain between the electrode plates 209 by a residual 2.80 G force holding them between the electrode plates 209.

Figure 7A:
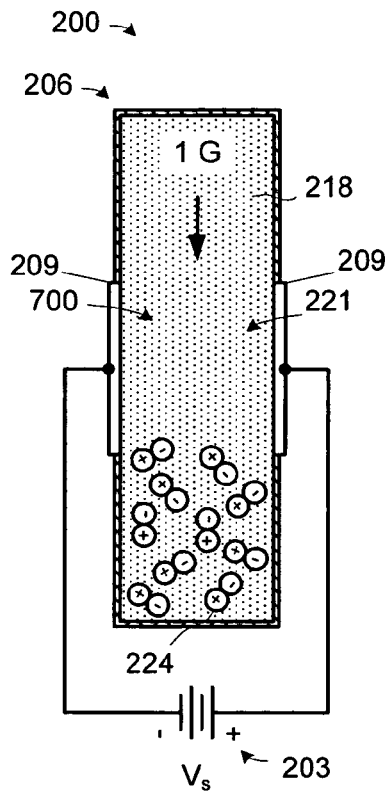
FIG. 7A-FIG. 7C illustrate the effect of acceleration on the dielectric element suspended in the fluid of an accelerometer derived from the fixture of FIG. 2.

The effect demonstrated in the fixture of FIG. 2 and FIG. 3 can be utilized to form a simple accelerometer. This effect is demonstrated in FIG. 7A and FIG. 7B. In this example, a 1 G acceleration is applied to the fixture in the direction shown. FIG. 7A demonstrates the bunching and compacting of electric dipoles associate with the high dielectric material near the lower portion of the fixture due to the acceleration when no voltage is applied to the plates, as was discussed above.

Figure 7B:
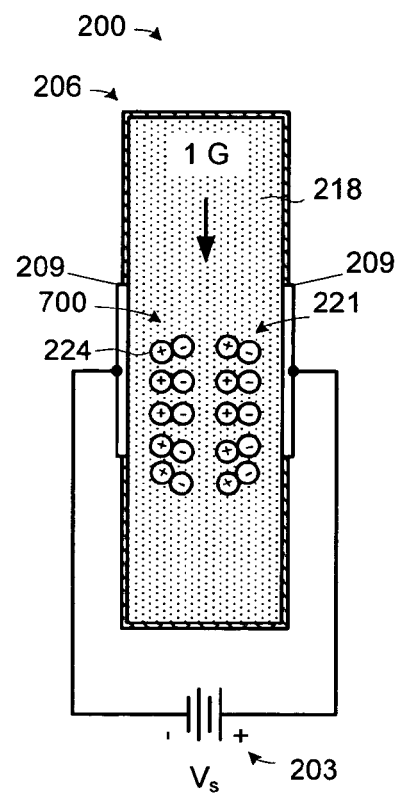

FIG. 7B shows the idealized positioning of the electric dipoles when a relatively large voltage has been applied to the plates for a very long time. Note that the dipoles have been attracted to and nearly centered between the plates. Furthermore, note that the dipoles are not perfectly centered and that due to the effects of the acceleration are slightly excentered. The degree to which most or all of the dipoles are centered between the plates will be related to the magnitude of the mass-times-acceleration forces as compared to electric field forces associated with the magnitude of the applied electric field and the relative dielectric of the high dielectric material versus that of the fluid.

Figure 7C:
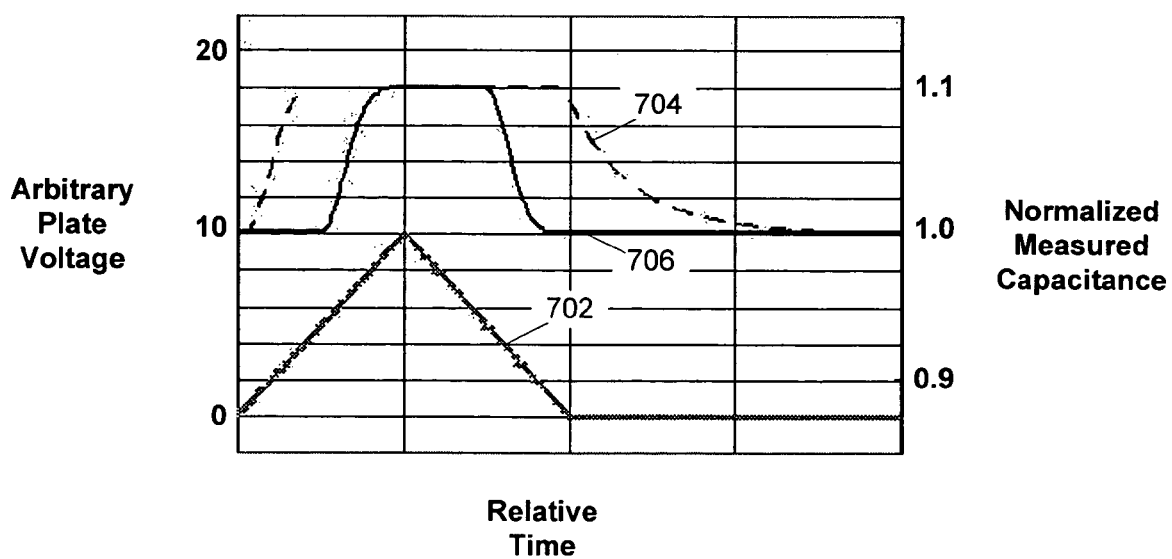

FIG. 7C demonstrates the manner in which the fixture of FIG. 7A and FIG. 7B might be used to indicate the applied acceleration. In FIG. 7C, the traces 702, 704, 706 represent the voltage applied to the plates 209; the idealized capacitance measured on the plates 209 for a zero G acceleration; and the idealized capacitance measured on the plates 209 for a 1.0 G acceleration, respectively. Note that the capacitance for the case where no voltage is applied and for either no acceleration or a 1 G acceleration has been normalized and is assumed to be 1.

The applied voltage 702 is ramped positive for one division of the graph, to an arbitrary value of 10, then negative for a second division to zero. After which it remains at zero. Some of the assumptions made in this example are that: (1) the maximum field or voltage applied to the fixture is about twice that required to overcome the acceleration forces applied to the fixture with a 1 G acceleration, and (2) there is a natural repulsion force of the dipoles when not acted upon by any acceleration as might be depicted in FIG. 2 and that this force is approximately one-tenth the force associated with a 1 G acceleration. Of course these assumptions are simply made to provide an example of the effect. The absolute value of these forces are not material to the demonstration of the applicable phenomenon.

For the zero G example, represented by the trace 704, as soon as the voltage 702 is applied to the plates 209, the capacitance measured between the plates 209 begins to increase. This is due to the fact that the field required to overcome the effects of repulsion of the electric dipoles 224 is relatively small and as soon as a field is applied the dipoles 224 begin to migrate into the region 400 between the plates 209. The higher the voltage applied to the plates 209 the more the dipoles 224 associated with the dielectric material migrate to this region 400. The relative capacitance approaches 1.1, meaning that nearly all or 100% of the dipoles 224 exist between the plates 209 and the volume percentage is sufficient to produce a 10% increase in capacitance. Also, note that in the zero G example, the dipoles 224 do not begin to leave the region 400 between the plates until the applied voltage 702 is nearly zero. Finally note that since the forcing functions are relatively low, it takes a relatively long period of time for the dipoles 224 to equally distribute themselves and the capacitance to return to the 1.0 value.

The 1 G example, represented by the trace 704, is similar with the exception that it takes a relatively significant voltage to overcome the effects of the 1 G acceleration. In this example, it is assumed to be the plate voltage of 5V. Once the plate voltage exceeds 5V, the effects of the acceleration forces are overcome by the plate forces and the dipoles 224 are attracted to the region 400 between the plates 209. Similarly, once the plate voltage drops below 5V, acceleration then overcomes the plate forces and the dipoles 224 begin to migrate to the bottom of the fixture 200.

Note that the embodiment of FIG. 7A-FIG. 7C is not particularly rugged. High accelerations could cause the dielectric material to impact itself on one end of the fixture 200. If that should happen, the forces needed to be overcome would not be that of acceleration alone and would complicate the measurement. Thus, some care should be utilized in selecting applications for the embodiment of FIG. 7A-FIG. 7C. Note also that, in the example of FIG. 7A-FIG. 7C, the determination of acceleration does not account for the viscosity of the dielectric fluid 218. This may be justified in embodiments where the particle size, fluid viscosity, and measured accelerations are of the proper relative magnitudes. However, in other embodiments, and as a general rule, the measurement will want to account for the effects the viscosity of the low dielectric fluid 218 may have on the movement of the high dielectric element 221. The effects of viscosity on the measurement are considered a bit more rigorously in the following embodiments.

Figure 8:
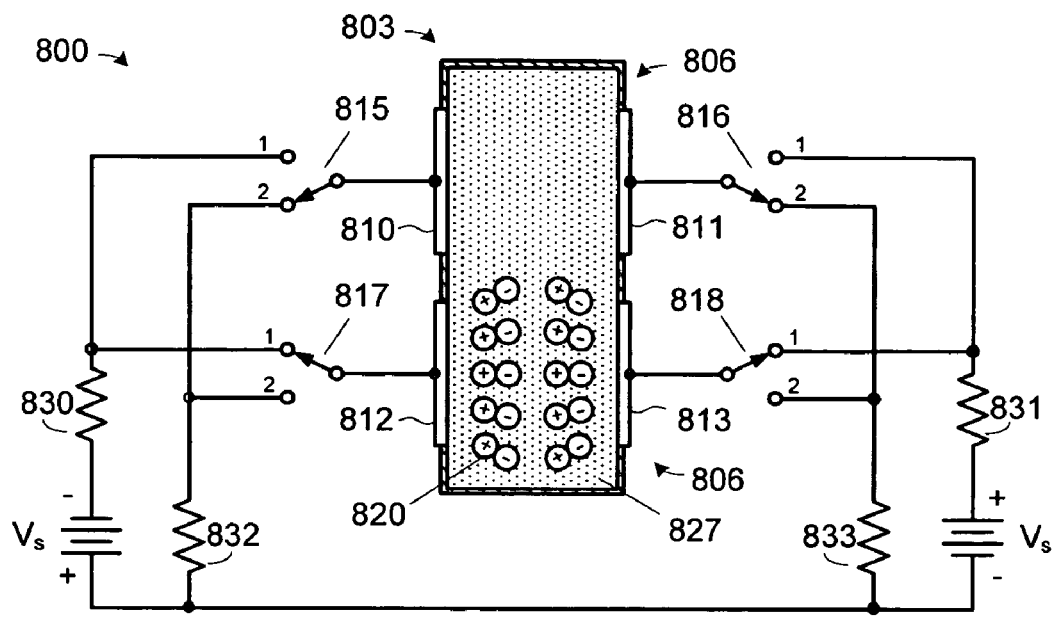
FIG. 8 is a block diagram of a multiple-electrode fluid dielectric fixture at t<0 in accordance with one particular embodiment of the present invention.

Thus, in this embodiment of the present invention acceleration is measured by positioning a high dielectric element 221 suspended in a low dielectric fluid 218 contained between a pair of charged electrode plates 209. The illustrated embodiment positions the high dielectric element 221 by centering the high dielectric element 221 between the charged electrode plates 209. The acceleration is measured by determining the voltage which produces a change in capacitance across the charged electrode plates 209. For this embodiment, the magnitude of the acceleration is proportional to the voltage applied to the plates. Now, consider the accelerometer 800, first shown in FIG. 8. The accelerometer 800 includes a multiple electrode fluid dielectric fixture 803. The fixture 803 comprises two pairs 806 of electrode plates 810-813, the first being composed of plates 810, 811 and the second being composed of plates 812, 813. Each electrode pair 806 has a pair of double-pole switches 815, 816 and 817, 818, respectively, associated with it to allow application of either the source voltage or a reference ground potential. Note that the plates 810, 812 and the associated switches 815, 817 are connected to the source to provide a negative voltage potential to the plate when the switch is in position 1. Likewise, the plates 811, 813 are connected to the source in a manner to apply a positive voltage to the plates 811, 813. In FIG. 8, a voltage of $\pm V_S$ is applied to electrode plates 812, 813 (817, 818 are in position 1) while all other electrode plates are grounded (all other switches are in position 2). Note that as depicted, there is no externally applied acceleration and most of the high dielectric dipoles have been attracted to and are present between plates 812, 813. This condition is at time, t<0.

Figure 9:
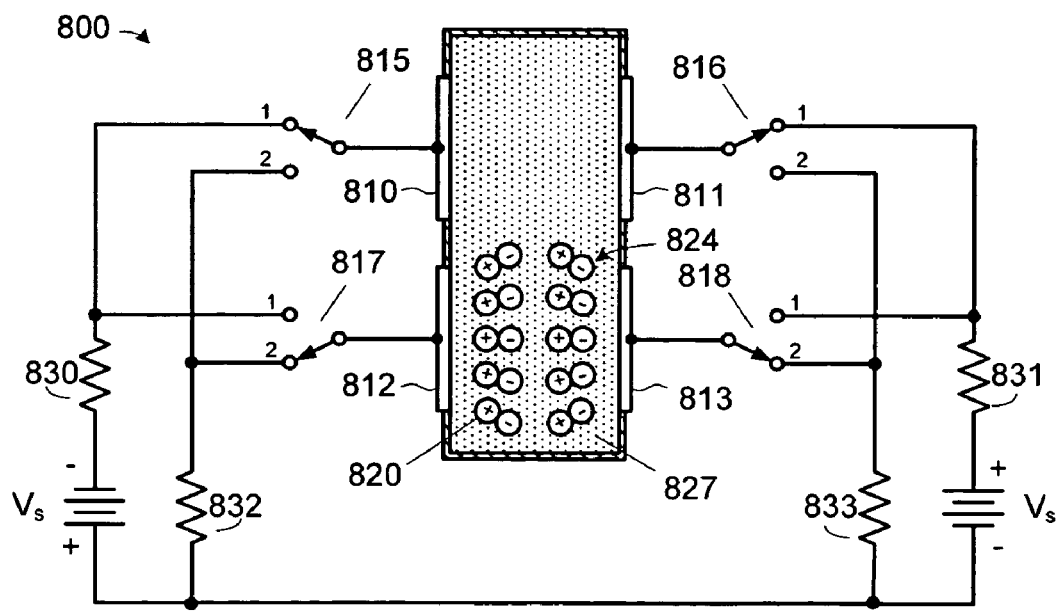
FIG. 9 illustrated the effect of changing switch positions in the fixture of FIG. 8 at t=0.

FIG. 8 depicts time t<0. FIG. 9 depicts the apparatus at time t=0 when the switches 817, 818 are switched from position 1 to 2; and, simultaneously 815, 816 are switched from position 2 to 1. Because of fluid drag and momentum, the dipoles 820, only one indicated, will not instantly move from between plates 812, 813 to plates 810, 811. Since the dielectric element 824, or dipoles 820, are suspended in a liquid 827, it is assumed in the discussion below that the dominant forces restricting the motion of the dipoles 820 is due to viscous drag. The viscous drag or force, $F_D$, applied to an object as it attempts to move through a viscous fluid 827 is estimated as follows:

$$F_D = \frac{C_D \rho V_P^2 A_P}{2} \quad (15)$$

where:

$C_D$=the coefficient of drag of the dipole 820 in the fluid 827;

$\rho$=the density of the fluid 827;

$V_P$=the velocity of the dipole 820 in the fluid 827; and $A_P$=the frontal area of the dipole 820 in the fluid 827.

Figure 10:
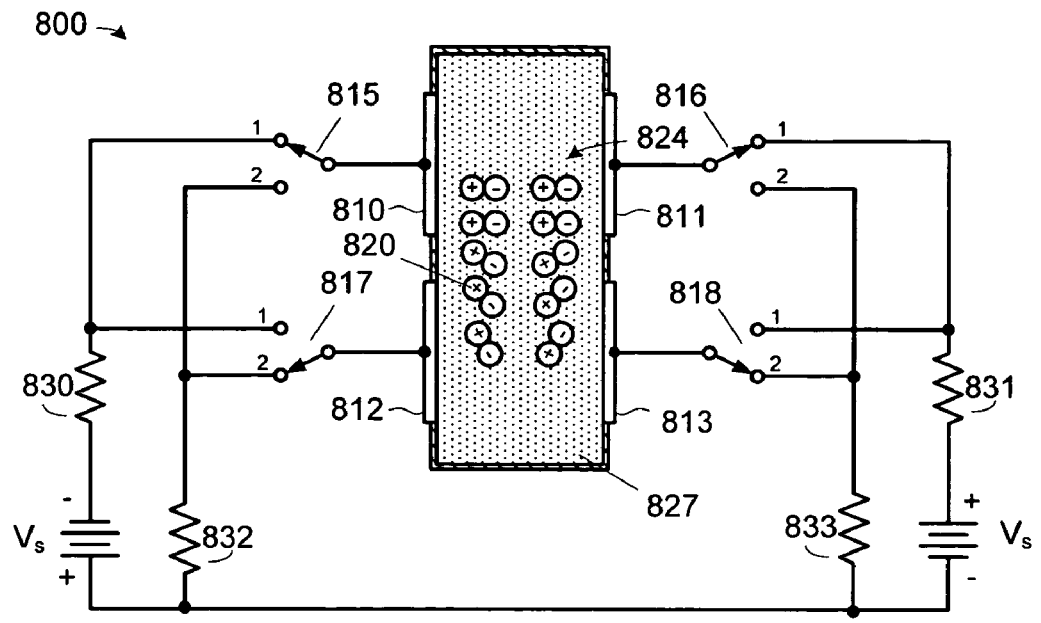
FIG. 10 illustrated dipole movement toward polarized plates in the fixture of FIG. 8 at $t=T_1$, where $T_1>0$.
Figure 11:
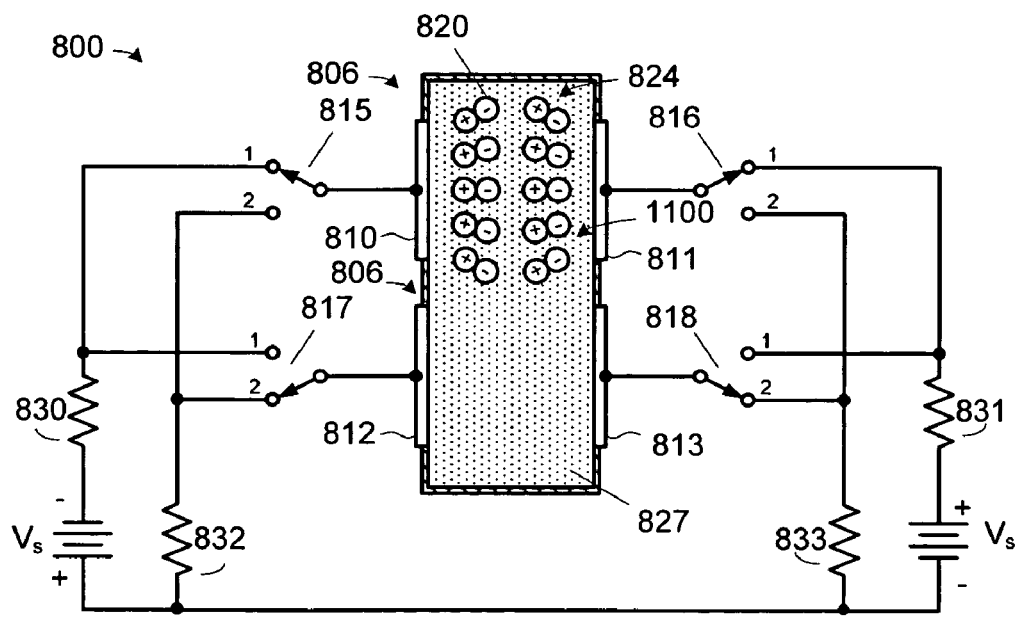
FIG. 11 illustrated dipoles in a stabilized orientation in the fixture of FIG. 8 at $t=T_2$, where $T_1<T_2$.

FIG. 10 depicts the dipoles 820 at some time t>0 while the dipoles 820 are moving toward the electrode plates 810, 811; yet, because of the effects of viscous drag, some dipoles 820 are still between 812, 813. This condition exists at some instant where t>0. Arbitrarily, this instant in time will be defined as t=$T_1$. In FIG. 11, most of the dipoles 820 have reached their equilibrium position between electrode plates 810, 811. This condition exists at some instant where t>0 and t>$T_1$. Arbitrarily, this instant in time will be defined as t=$T_2$.

In the accelerometer 800 of FIG. 11, multiple low-level AC current sources can be placed across each of the electrode pairs 806. By measuring the resultant AC voltage and phase, the capacitance of the electrode pairs 806 can be measured while the switch positions are changed. In the following discussions, the capacitance measured across electrode plates 810, 811 will be referred to as $C_{12}$ and the capacitance across the plates 812, 813 will be referred to as $C_{34}$. It can be seen that the capacitance measured across the plates 812, 813 in FIG. 8 at time t<0 is the same as that measured across plates 810, 811 in FIG. 11 at time t=$T_2$.

If the dimensions of the apparatus in FIG. 11 are equivalent to those of the apparatus of FIG. 4, this capacitance is the same as calculated above and defined as $C_2$. Therefore:

$$C_{34}(\text{at } t<0) = C_{12}(\text{at } t=T_2) = 0.0025 \text{ pF}$$

Similarly:

$$C_{34}(\text{at } t=T_2) = C_{12}(\text{at } t<0)$$

However, it should be noted that the capacitance, $C_{34}$, at time, $t=T_2$ is not equal to the value $C_1$ computed previously because most of the dielectric element 824 has been attracted to and exists between plates 810, 811. Therefore, the relative dielectric $K_0$ of the region 1100, shown in FIG. 11, between plates 812, 813, is nearly that of free space or approximately equal to 1. The corresponding capacitance, $C_0$ is:

$$C_{12}(\text{at } t<0) = 0.0022 \text{ pF} \quad (16)$$

Because the capacitance $C_0$ is less than $C_1$, the actual force exerted on the high dielectric particles is greater than that calculated previously. Using Eq. (4), the new centering force, $F_C$, and G force, $G_F$, are, $$F_C = 4.51\text{E-}07 \text{ grams}$$

$$G_F = 5.51 \text{ Gs}$$

Note that, in the previous example, the capacitances $C_{12}$, $C_{34}$ measured between plates 810-813 change as the electrode plates 810-813 are charged and discharged. Providing no dipoles 820 are lost in the process of changing charge, the capacitances $C_{12}$, $C_{34}$ measured when one pair 806 of the electrode plates 810-813 is energized will be the same as the capacitance $C_{12}$, $C_{34}$ measured across a different pair 806 of electrode plates 810-813 when that pair 806 has been energized. It will be demonstrated that information about the applied acceleration field can be determined, not by the capacitance $C_{12}$, $C_{34}$, but by the relative rate of change of that capacitance $C_{12}$, $C_{34}$.

When no acceleration force is applied to the apparatus at time $t=T_1$, the dipoles 820 will move to the energized electrode plates 810, 811 at a velocity where the centering force, $F_C$, generated by the energized electrode pair 806 is just equal to the viscous drag force, $F_D$, generated by the dipole 820 moving through the low dielectric fluid 827. Thus, $$F_D = F_C \quad (17)$$

If an acceleration is applied to the fixture 806, the acceleration force, $F_A$, exerted on the buoyant mass of the dipoles 820 will combine with the centering force $F_C$ to either increase or decrease the allowable viscous drag force $F_D$. Thus:

$$F_D = F_C + F_A \quad (18)$$

Combining Eq. (4), Eq. (15) and Eq. (17) yields, $$\frac{C_D \rho V_P^2}{2} = \frac{V_s^2}{2L}(C_2 - C_1) + mA \quad (19)$$

Solving Eq. (19) for the dipole particle velocity $V_P$ yields:

$$V_P = \left[\frac{2}{C_D \rho A_p}\left[\frac{V_s^2}{2L}(C_2 - C_1) + mA\right]\right]^{0.5} \quad (20)$$

where:
 m=the buoyant mass of the dipole particle; and
 A=the acceleration of gravity.

Returning to FIG. 9, consider where, at time $t=0$, the switches 815-818 have instantaneously changed position; yet, the dipoles 820 still remain between electrode plates 812, 813. If a force of acceleration, $F_A$, is applied to the fixture 806 in a direction which directly opposes the centering force, $F_C$, the value of $F_A$ will be negative and, by Eq. (20), will reduce the velocity $V_P$ of the dipoles 820. Similarly, positive acceleration forces $F_A$ or those that assist the centering force $F_C$ will increase the particle velocity $V_P$.

Referring to Eq. (20), the voltage applied to the plates, $V_S$, can be adjusted to control the centering force $F_C$. For example, if the acceleration force $F_A$ is negative, the plate voltage can be adjusted such that the centering force $F_C$ just equals the acceleration force $F_A$. In that instance, there will be very little force attracting the dipoles 820 between the energized plates 810-811. In practice, there is no ideal voltage which will make the centering force $F_A$ exactly equal to the applied acceleration force $F_A$ for all dipoles 820. The dipoles 820 nearest the energized plate will see the greatest force and will eventually migrate slowly between the energized electrode plates 810-811. Some dipoles 820 may be at just the right distance from the electrode plates 810-811 and will be suspended and motionless. While other dipoles 820 will be far enough away from the electrode plates 810-811 that the acceleration force $F_A$ will pull the dipoles 820 further away from the energized plates 810-811.

From Eq. (20), it can be seen that the physical properties of the low relative dielectric fluid 827 and the high dielectric element 824 can affect the particle or dipole velocity, $V_P$. $C_D$ is the coefficient of drag of the dipole 820 and is a function of the shape and velocity of the dipole 820 and of the kinematic viscosity of the fluid 827. The velocity $V_P$ is also dependent on the density, $\rho$, of the fluid 827 and the frontal area, $A_P$, of the dipole 820. Thus, in the design of the accelerometer 800, the properties of the low dielectric fluid 827 and the high dielectric element 824 are important and selection of the dielectric materials will be implementation specific.

For the following discussion, it is assumed that the motion of the dipoles 820 as they move from between one set of electrode plates 806 to the region between another can be described by an exponential function. For example referring to FIG. 9, those dipoles 820 which are relatively close to plates 810, 811 will see the highest attraction forces and will therefore quickly be pulled into the region between 810, 811. On the other hand, the dipoles 820 furthest away from plates 810, 811 will have relatively small attractive forces and will move towards plates 810, 811 relatively slowly. Therefore, almost immediately after the switch positions are changed at $t=0$, a large number of dipoles 820 will move and be captured by the energized electrode plates 810, 811. As time goes on, fewer and fewer dipoles 820 will move between the energized electrode plates 810, 811. Only after a relatively long time will most or essentially all of the dipoles 820 be present between the energized electrode plates 810-811 as depicted in FIG. 11.

Figure 12:
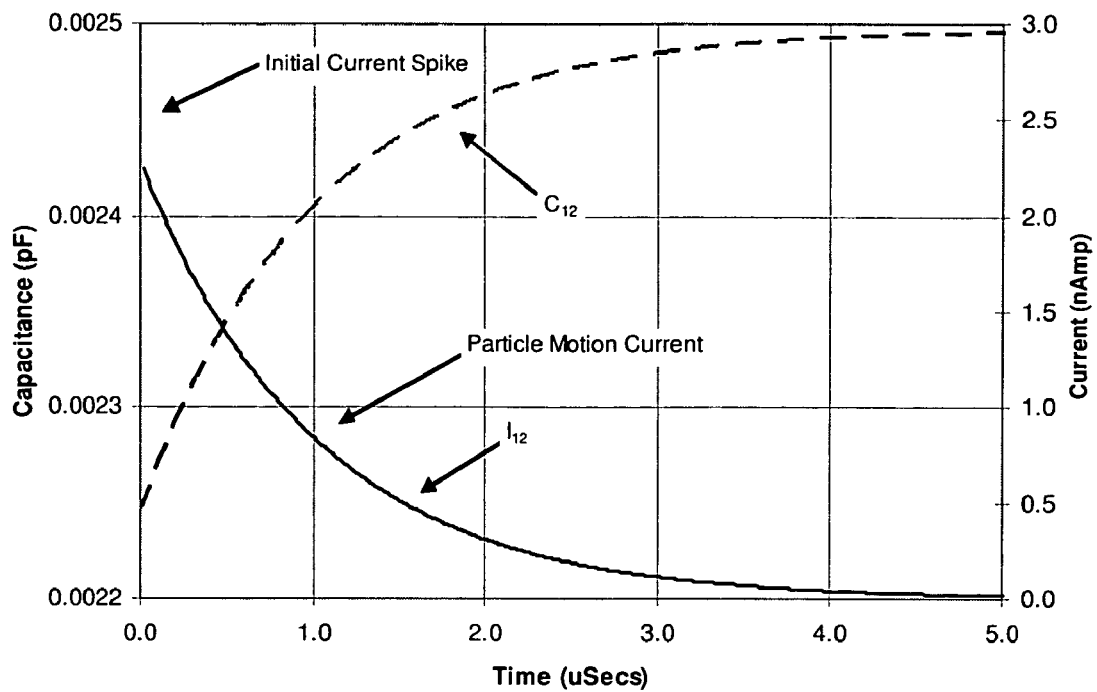
FIG. 12 graphs idealized plate capacitance and current versus time for the accelerometer of FIG. 8 in the absence of acceleration.

FIG. 12 presents the idealized capacitance, $C_{12}$, measured at the electrode plates 810, 811 as the dipoles 820 migrate to the region between the electrode plates 810, 811 when no acceleration is applied to the accelerometer 800. Note that the waveforms of FIG. 12 assume that the viscosity and density of the low dielectric fluid 827, the particle size and relative dielectric of the dielectric element 824, and the voltage applied to the electrode plates 810, 811 are suitably chosen so as to provide a 1 μsec time constant for the motion of the dipoles 820. It is further assumed that the time constant of particle motion and capacitance is essentially inversely proportional to the particle velocity, $V_P$. Thus, a doubling of the particle velocity $V_P$ will reduce the time constant by one half.

FIG. 12 also shows the idealized current, $I_{12}$, traveling from the voltage sources and charging the electrode plates 810, 811. In computing this current, the voltage applied to the plates was adjusted such that G-force, $G_F$, applied to the dipoles 820 is approximately 2 Gs. Using Eq. (3) and assuming similar apparatus and particle geometries as described previously, that source voltage is calculated to be ±9.04 Volts. For this analysis, the apparatus resistances for the resistors 830-833 are 20 MΩ.

In FIG. 12, the current, $I_{12}$, can be characterized as having two primary features. The first feature is identified as an Initial Current Spike. This spike is caused by the initial charging of the plate, 810, 811, which begins at time, t=0. During this initial spike the voltage sources are charging an initial capacitance, 0.0022 pF to the source voltage. The charge rate is defined by the exponential time constant associated with initial capacitance and the 20 MΩ circuit impedance, or 44 nsec. The idealized peak current (not shown on this graph) would be 452 nA. The particle motion current or slow exponential discharge of the plate current, $I_{12}$, which follows the initial current spike, is directly related to and indicative of the plate capacitance and the motion of the dipoles 820 as they move to the region between the electrode plates 810, 811. Note, this current curve exhibits the same time constant as the time constant of motion which in this example is 1 μsec.

Figure 13:
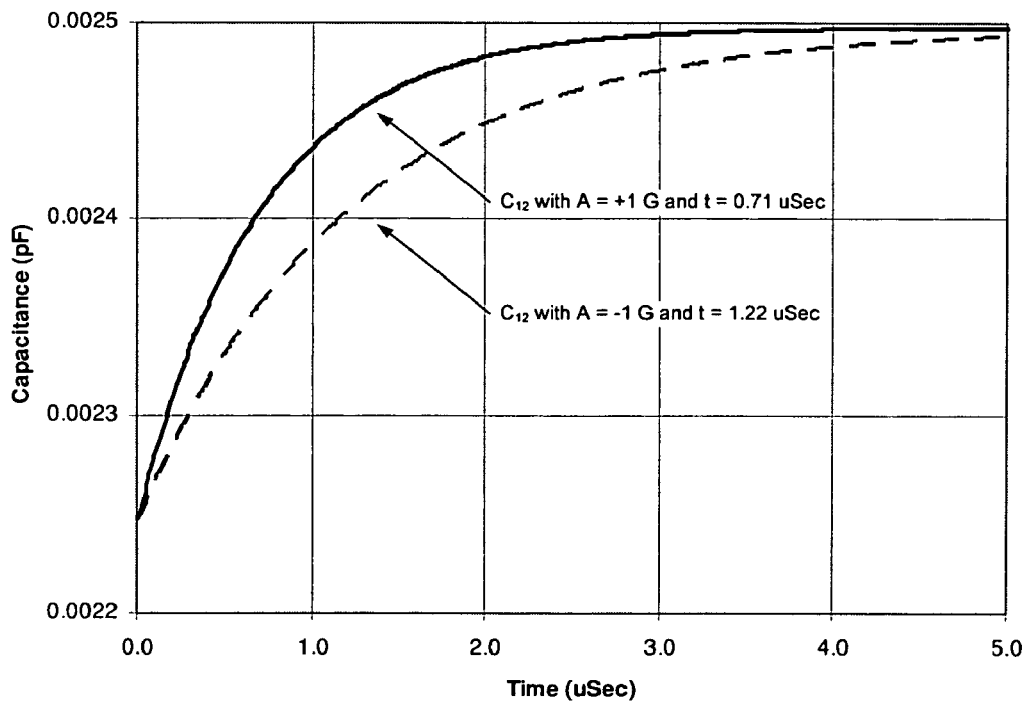
FIG. 13 graphs idealized plate capacitance versus time for ±1 G acceleration for the accelerometer of FIG. 8.

Now consider the effects of a ±1 G acceleration (the acceleration of gravity) on the accelerometer 800. Remember that the plate voltage has been adjusted such that the centering force applied to the dipoles 820 is approximately equal to the force associated with 2 Gs acceleration acting upon the mass of the dipole and that centering force $F_C$ results in 1 μsec time constant of motion when no acceleration is applied. If the acceleration forces are in line with the particle acceleration forces then the forces acting on the dipole 820 are associated with the particle mass times the acceleration of either +1 G or +3 G dependent on the direction of the acceleration. Again it has been assumed that the time constant of particle motion is inversely proportion to the particle velocity. As shown in FIG. 13, when a positive 1 G acceleration is applied to the accelerometer 800, the particle velocity, $V_P$, of the dipoles 820 will be increased and the time constant of motion and the associated plate capacitance, $C_{12}$, will be decreased from 1 μsec to 0.71 μsec. Similarly, applying a negative 1 G acceleration increases the capacitance time constant to 1.22 μsec.

Thus, as shown in FIG. 13, the dipole particle velocity $V_P$ and associated rate of change of the plate capacitance provide information about the applied acceleration. Although this could be measured by measuring the particle motion current portion of the $I_{12}$ waveform shown in FIG. 12, this particular embodiment avoids this measurement due to the low amplitude of such a measurement as compared to that of the initial current spike.

Figure 14:
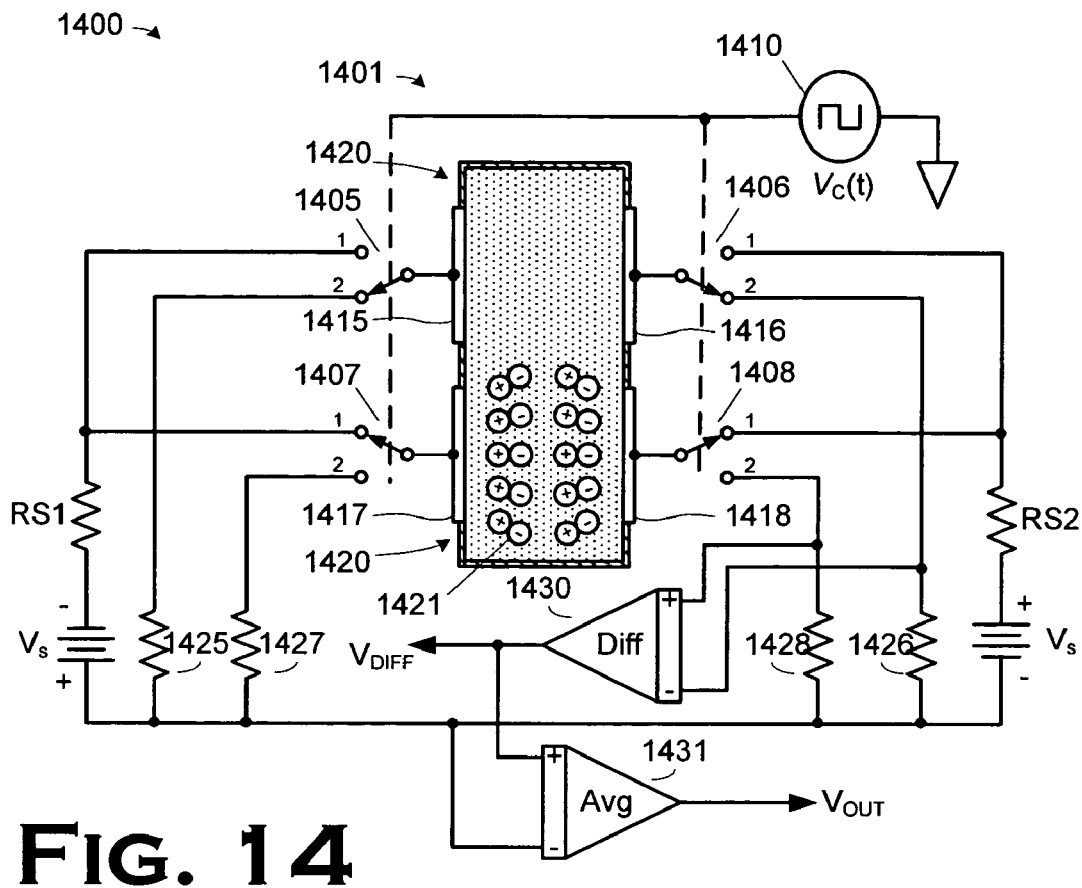
FIG. 14 is a block diagram of an open-loop design in one embodiment of the present invention.

FIG. 14 shows one embodiment 1400 of the invention embodying an open-loop design. The switches, 1405-1408, are electrically controlled using a square-wave generator 1410 ($V_C(t)$). In this embodiment, the square-wave generator 1410 is connected such that when its output is low, all four switches 1405-1408 are in the positions shown. When the generator output is high, the switches 1405, 1406 are switched to position 1 and switches 1407, 1408 are switched to position 2. In this embodiment, the duty cycle of the square-wave generator 1410 is fixed at 50% and the period of the drive waveform is selected to be twice the time constant of the apparatus time constant of motion, or 2 μsec.

In the circuit of FIG. 14, individual resistors 1425-1428 have been placed in the discharge for each of the electrode plates 1415-1418. Thus, the plate discharge current for the electrode plate 1415 can be determined by measuring the voltage across resistor, 1425, when the switch 1405 is switched from position 1 to 2. Similarly, the discharge current for each of the electrode plates 1415-1418 can be measured by measuring the voltage across its respective discharge resistor 1425-1428. In addition to the discharge resistors 1425-1428, devices 1430 and 1431 have been added to the circuit. 1430 is a differential amplifier which has been connected to allow measurement of the potential difference, $V_{DIFF}$, across resistors 1426 and 1428. 1431 is a device that is connected to provide an accelerometer output, $V_{OUT}$, which is the average of the differential output, $V_{DIFF}$.

Figure 15:
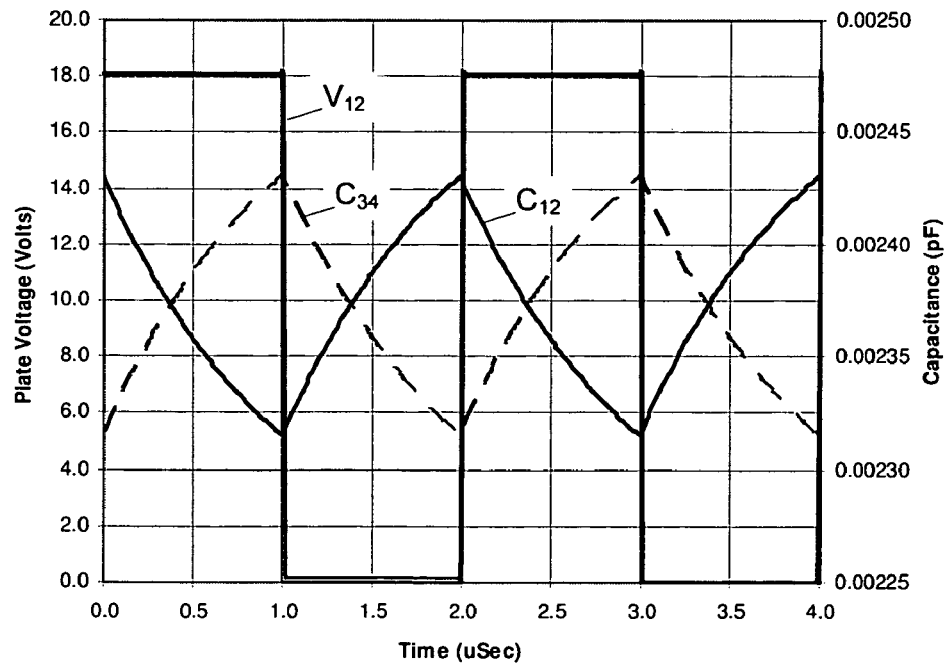
FIG. 15 graphs plate capacitance over time for a 50% duty cycle control signal with no acceleration in the accelerometer of FIG. 14.

FIG. 15 shows the idealized plate capacitance change, $C_{12}$ and $C_{34}$, associated with the electrode plates 1415, 1416 and 1417, 1418, respectively as the switches 1405-1408 are controlled by the square-wave source 1410. For reference, the plate voltage for the electrode plates 1415, 1416 is shown and referred to as $V_{12}$. In FIG. 15, there is no applied acceleration force; therefore, both plate pairs 1420 (i.e., electrode plates 1415, 1416 and 1417, 1418) achieve the same minimum and maximum capacitance. This implies that the high relative dielectric dipole particles 1421, only one indicated, never really migrate fully between one set of electrode plates to the other. Instead, the dipole particles 1421 reach an equilibrium; whereby on the average, the dipole particles 1421 are midway between the electrode plates 1415-1418. The excitation voltage tends to pull a disproportionate quantity of particles from one electrode plate set to the other and visa versa.

Figure 16:
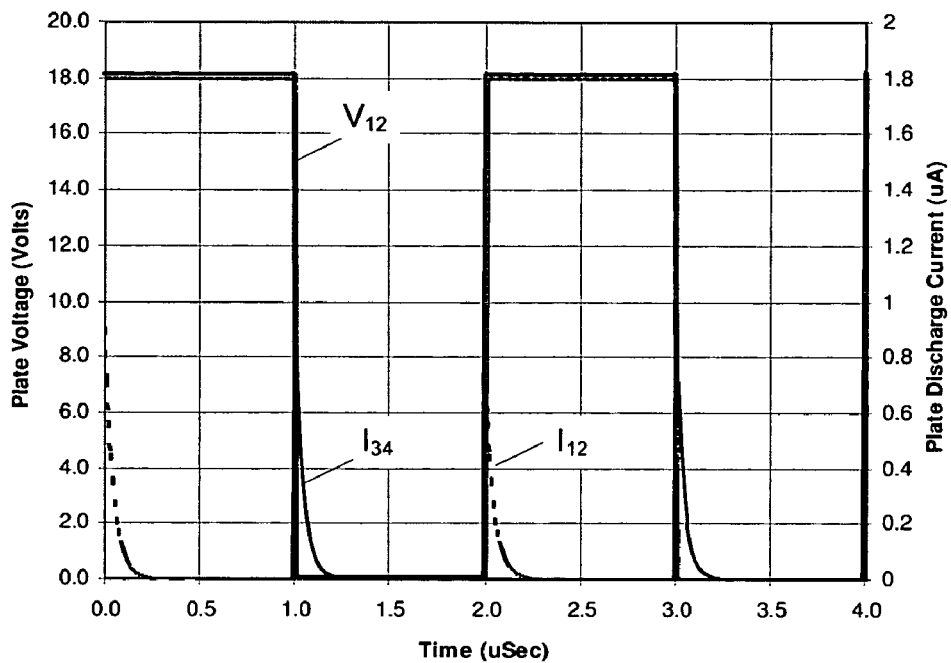
FIG. 16 graphs the plate discharge current over time for a 50% duty cycle control signal with no acceleration in the accelerometer of FIG. 14.
Figure 17:
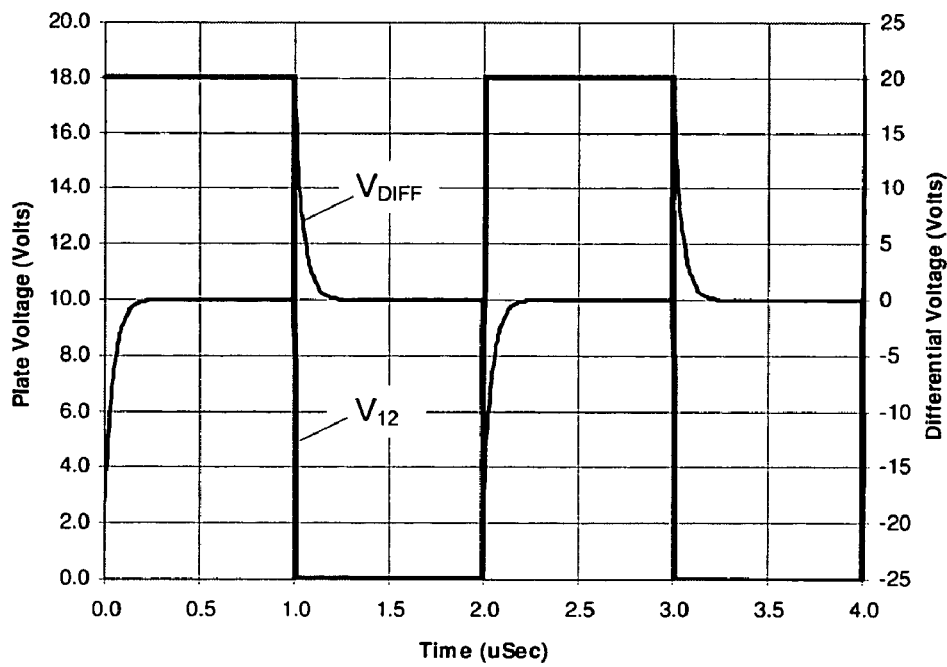
FIG. 17 graphs a differential voltage over time for a 50% duty cycle control signal with no acceleration in the accelerometer of FIG. 14.

FIG. 16 shows the idealized plate discharge current, $I_{12}$ and $I_{34}$, associated with plates, 1415, 1416 and 1417, 1418, as the switches 1406 and 1408 switched to position 2. For reference, the plate voltage for the electrode plates 1415, 1416 is shown and referred to as $V_{56}$. For this analysis the discharge measurement resistors, 1425 through 1428, have a value of 20 MΩ. The discharge current signals across 1426 and 1428 are measured by the differential amplifier, 1430. FIG. 17 shows the output of the differential amplifier, $V_{DIFF}$. Note that the peak amplitude and wave shape of the discharge currents of FIG. 17 are equal but opposite. Thus, when the differential voltage, $V_{DIFF}$, is averaged in the averaging circuit, 1431, the output will be zero.

Now consider the effect on the circuit when a +1 G acceleration is applied to fixture. As was demonstrated previously, the +1 G acceleration will reduce the time constant of particle motion when particles are moving from between the electrode plates 1417, 1418 to between the electrode plates 1415, 1416. However, the same acceleration will increase the time constant when particles are moving back to between the electrode plates 1417, 1418. The combined forces, made up of the acceleration force $F_A$ and the centering force $F_C$, will be imbalanced; and, that imbalance will tend to force and hold most of the particles between the electrode plates 1417, 1418.

Figure 18:
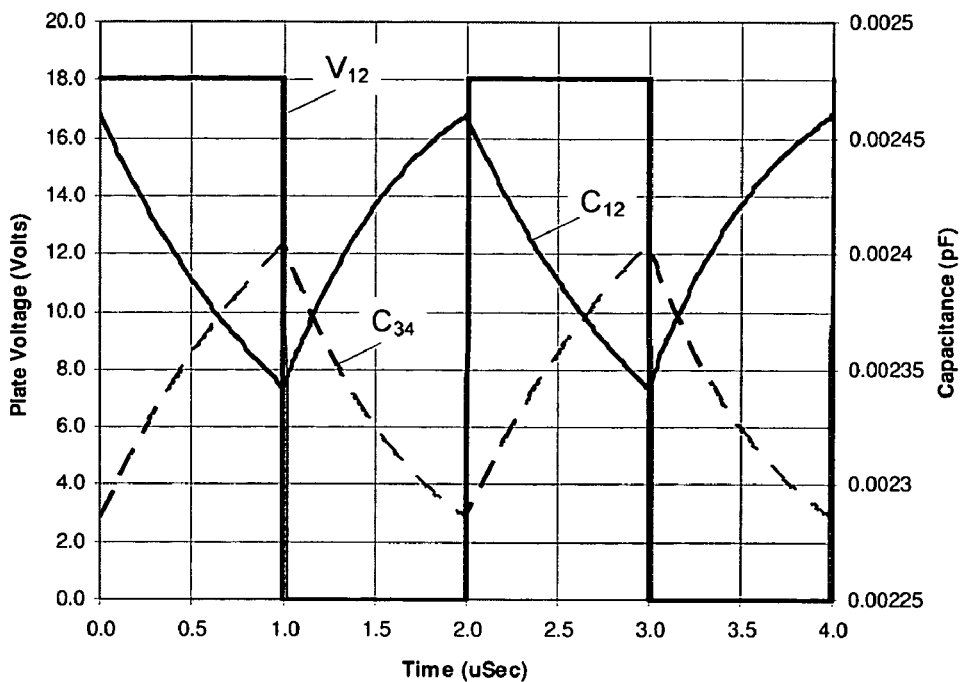
FIG. 18 graphs plate capacitance over times for a 50% duty cycle control signal with a +1 G acceleration applied to the accelerometer of FIG. 14.

FIG. 18 presents the plate capacitance for a +1 G acceleration. Note that $C_{12}$ approaches a value close to the maximum capacitance achievable, when most of the dipole particles 1421 exist between the electrode plates 1415, 1416. When most of the dipole particles 1421 are between the electrode plates 1415, 1416, few will be between the electrode plates 1417, 1418; therefore, $C_{34}$ nearly achieves its minimum capacitance. Because the switches 1405-1408 are switched before all the dipole particles 1421 can migrate, the capacitances no longer achieve equal values as was the case for a 0 G applied acceleration.

Figure 19:
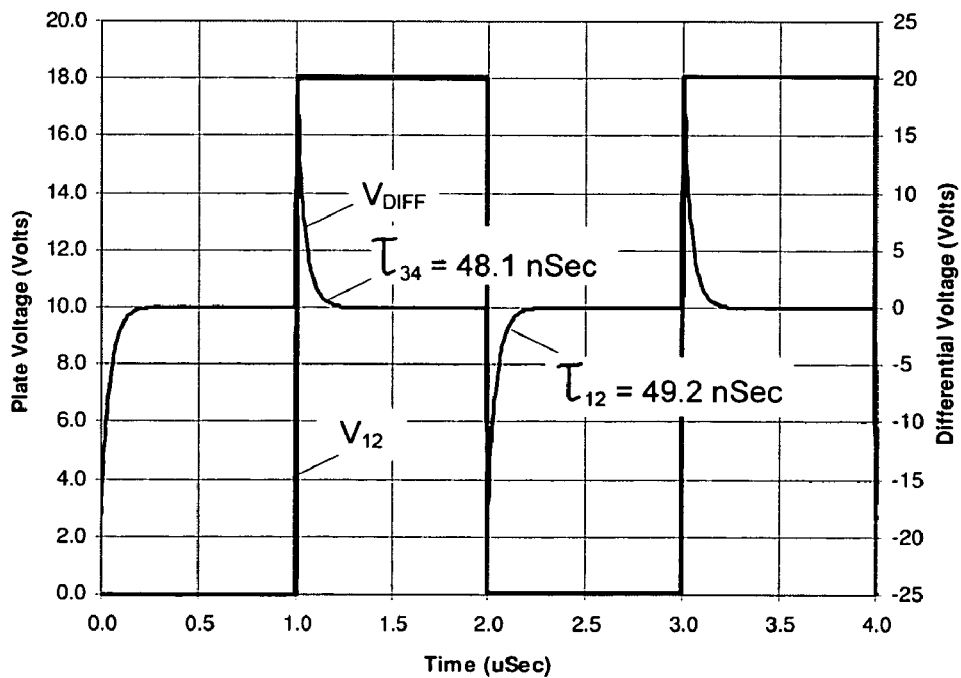
FIG. 19 graphs the differential voltage of FIG. 17 over time with a +1 G acceleration.

FIG. 19 demonstrates the effect on the output of the differential amplifier, $V_{DIFF}$. Note that in this design, the peak amplitude of the differential waveform does not change because this is related to the voltage applied to the capacitors. Instead, the discharge time constant changes and is related to the plate capacitance at the time of discharge and the discharge resistance of 20 MΩ. The discharge time constant for the electrode plates 1417, 1418 is defined here as $\tau_{34}$ and is equal to 48.1 nsec. Whereas the discharge time constant, $\tau_{12}$, for electrode plates 1415, 1416 is 49.2 nsec. This difference in time constant will increase the area under the curve for the negative portion of the differential output. Consequently, the averaged output of the circuit, $V_{OUT}$, will be a net negative value. For this example, the value is estimated to be −1.33 mVolts.

Figure 20:
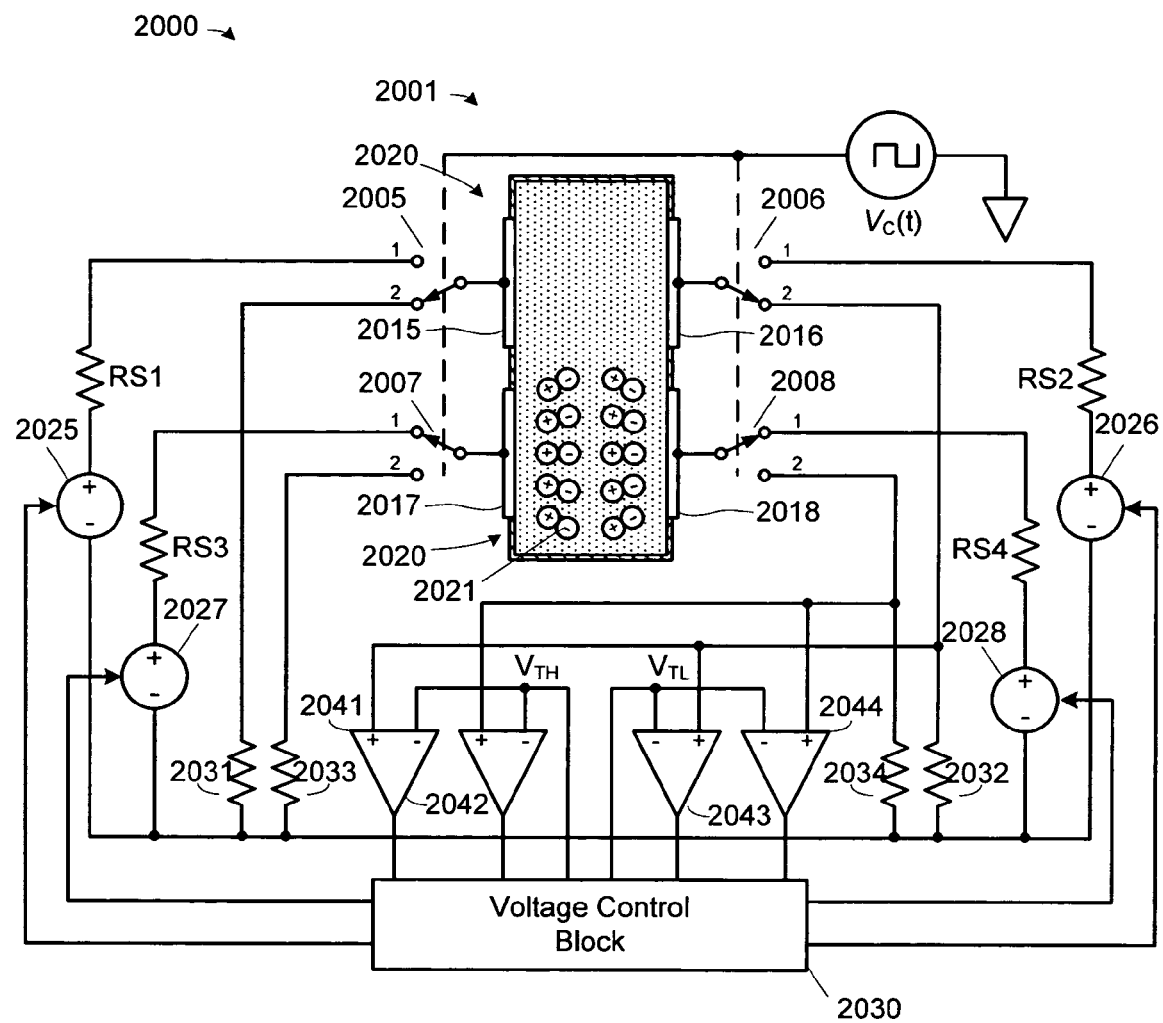
FIG. 20 is a block diagram of a closed-loop design in a second embodiment of the present invention alternative to that shown in FIG. 14.

Turning now to FIG. 20, a closed-loop accelerometer embodiment 2000 is illustrated. This embodiment 2000 is similar to the open-loop design 1400, shown in FIG. 14, in that the plate discharge current is used to control the feedback loop. Resistors 2032 and 2034 provide the desired current to voltage conversion. Voltage comparators, 2041 through 2044, are used to determine that instant in time in which the discharge current crosses a predetermined threshold voltage, $V_{TH}$ and $V_{TL}$, defined as voltage threshold high and voltage threshold low, respectively. The timing output from the voltage comparators is then fed into a voltage control block which uses the comparator output to calculate a control voltage output. The control voltage output is then fed to Voltage Controlled Voltage Sources ("VCVS") 2025-2028, outputting voltages $V_{P1}$-$V_{P4}$, respectively, to adjust the voltage applied to the plates.

Note that, in this circuit, the VCVS 2025-2028 output voltages, $V_{P1}$=−$V_{P2}$ and $V_{P3}$=−$V_{P4}$ and $V_{P2}$ and $V_{P4}$ are always positive. Also, the voltages associated with the electrode plates 1415-1416 are independently controlled and are not necessarily the same voltages as are applied to the electrode plates 1417-1418. In previous examples which used battery voltage sources for the electrode plates, a plate voltage of ±9.04 V was chosen so as to apply a force to the dipole particles 2021 equivalent to that force applied with a 2 G acceleration. In this example, it will be assumed that the minimum voltage of the VCVS 2025-2028 will be set to ±9.04 V. Also, the period of the switch control signal generator, $V_C(t)$, will remain 2 μsecs as it was in the previous example.

Now consider the condition in which a 0 G acceleration is applied to the fixture 2001. The Voltage Control Block 2030 will adjust the voltages such that the voltage applied to the electrode plates 1415-1418 is ±9.04 Volts; and, the waveforms will look much like those of FIG. 15 and FIG. 16 above. At this point, it is appropriate to describe the functions of the Voltage Control Block 2030 in more detail. The Voltage Control Block 2030 obtains timing input from the comparators 2041-2044 and produces voltages which control the voltage applied to the VCVS 2025-2028. Typically, the high and low threshold voltages, $V_{TH}$ and $V_{TL}$, will be set to values which will always be seen by the comparators during a discharge of the plates. Since, in this case, the minimum starting value of the discharge voltage is +9.04 V, the high threshold, $V_{TH}$ will be set to 8.0 V and the low threshold, $V_{TL}$, will be set to 2.0 V.

Note that the capacitor discharge characteristics are defined by the following equation, $$\frac{\Delta V}{\Delta t} = \frac{k}{C} \tag{21}$$

where:
  ΔV=the change in voltage;
  Δt=the change in time;
  k=constant of proportionality; and
  C=the capacitance to be measured.

Note also that the comparators will be responding to the same voltage. It can be seen that ΔV and k in Eq. (21) are a constant; thus, the relative timing of the comparator outputs during discharge of the plates is indicative of the discharge ramp rate and the plate capacitance at discharge.

Now consider the condition where an acceleration is applied to the fixture 2001. The applied field will tend to reduce the particle acceleration in one direction and increase it the other. As has been demonstrated, this will cause the discharge capacitance for one electrode plate pair 2020 to be lower than the other. The Voltage Control Block 2030 will use the comparator inputs to indicate that the discharge capacitance is different and will increase the VCVS source voltage for the lower capacitance plate set until the discharge capacitances are equal. The circuit of FIG. 20 represents a closed-loop design because the circuit servos the plate voltages to counteract the effects of an applied acceleration. The output which is indicative of applied acceleration is proportional to the difference in the VCVS outputs or $V_{P2}$-$V_{P4}$.

One problem in implementing the present invention is the very fast time constants associated with the small size the of the plate capacitance. One approach, illustrated in FIG. 21, would construct sensor 2100 using silicon micro-machining techniques as are commonly known. Using micro-machining techniques, multiple accelerometer cells 2103, only one indicated, could be constructed on a single silicon wafer substrate 2106 housed in a housing 2109. The accelerometer cells 2103 may include any of the designs discussed above, e.g., the open-loop design 1400, shown in FIG. 14 or the closed-loop design 2000 in FIG. 20. Multiple wafers 2106 can be combined in parallel, in a manner not shown, to further increase the overall capacitance.

Figure 21:
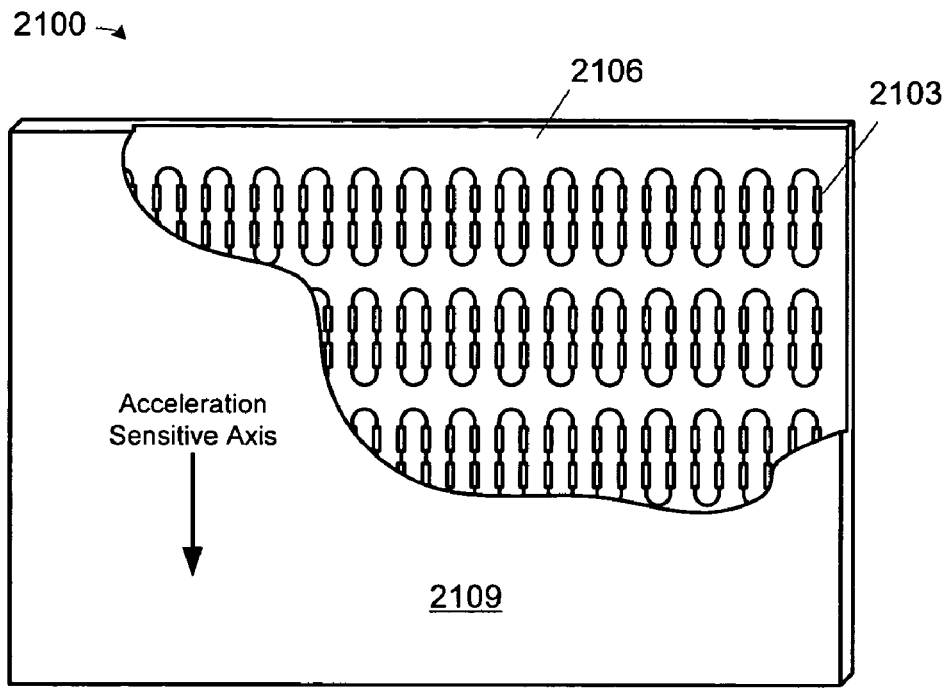
FIG. 21 is an assembled, partially sectioned drawing of a micro-machined accelerometer in accordance with the present invention.

The accelerometer fixtures shown in the previous example are designed to sense that component of acceleration which is parallel to the plate surfaces as shown in FIG. 21. Components of acceleration not in this direction will simply cause a slight increase in concentration of the dipoles at the face of one of the energized plates versus the other. Thus, the design is a single axis acceleration sensor.

Figure 22:
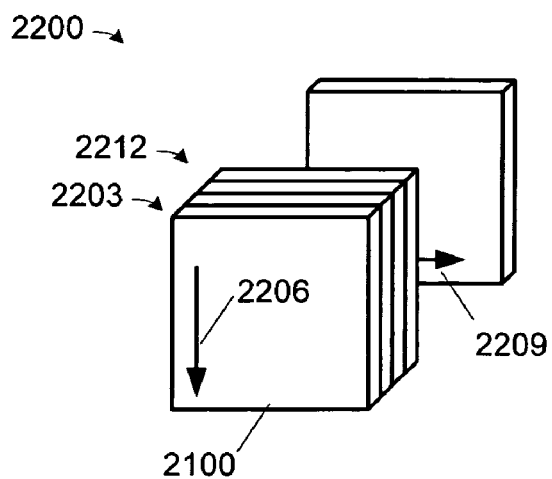
FIG. 22 illustrates how multiple micro-machined accelerometers such as the one in FIG. 20 can be stacked to measure acceleration on multiple axes.

However, the accelerometer design of FIG. 21 simplifies the measurement of acceleration in two axes. As shown in FIG. 22, the use of multiple, stacked sensors 2100 (only one indicated) simplifies the measurement of acceleration in two axes. One half 2203 of the stacked set 2200 can be oriented to allow sensing of acceleration in one direction, represented by the arrow 2206 (the "downward" direction in FIG. 22). The other half 2212 can be oriented for sensing of acceleration in an orthogonal axis, represented by the arrow 2209 (the "right" side of the page, in FIG. 22).

The relationship between electrostatic and electromagnetic accelerometer devices will now be discussed. To simplify this comparison the centering force equation for a dielectric will be rearranged incorporating the effects of the volume percentage of high dielectric material. Using Eq. (14), the force equation as a function of the volume percentage of high dielectric material becomes:

$$F_C = \frac{V_s^2 \varepsilon_0 b}{2d}[(1-v_2)^{-1} - 1] \tag{22}$$

Recognizing that:

$$[(1-v_2)^{-1} - 1] = \frac{v_2}{1-v_2} \tag{23}$$

And substituting Eq. (23) into Eq. (22) yields:

$$F_C = \frac{V_s^2 \varepsilon_0 b}{2d}\left[\frac{v_2}{1-v_2}\right] \quad (24)$$

From Eq. (24) it can be seen that, ignoring the effects of fringing, the centering force on the high dielectric particles is directly proportional to the volume percentage of high dielectric particles versus the volume percentage of low dielectric fluid between the plates.

Eq. (4) describes the centering force on a dielectric slab based on the difference in capacitance. This equation was derived using the stored energy. The energy stored in a capacitor is:

$$E_C = 0.5 C V^2 \quad (25)$$

Substituting Eq. (25) into Eq. (4) yields, $$F_C = L^{-1}(E_{C2} - E_{C1}) \quad (26)$$

where $E_{C1}$ and $E_{C2}$ correspond to the energy stored in the capacitance for the two states.

Figure 23:
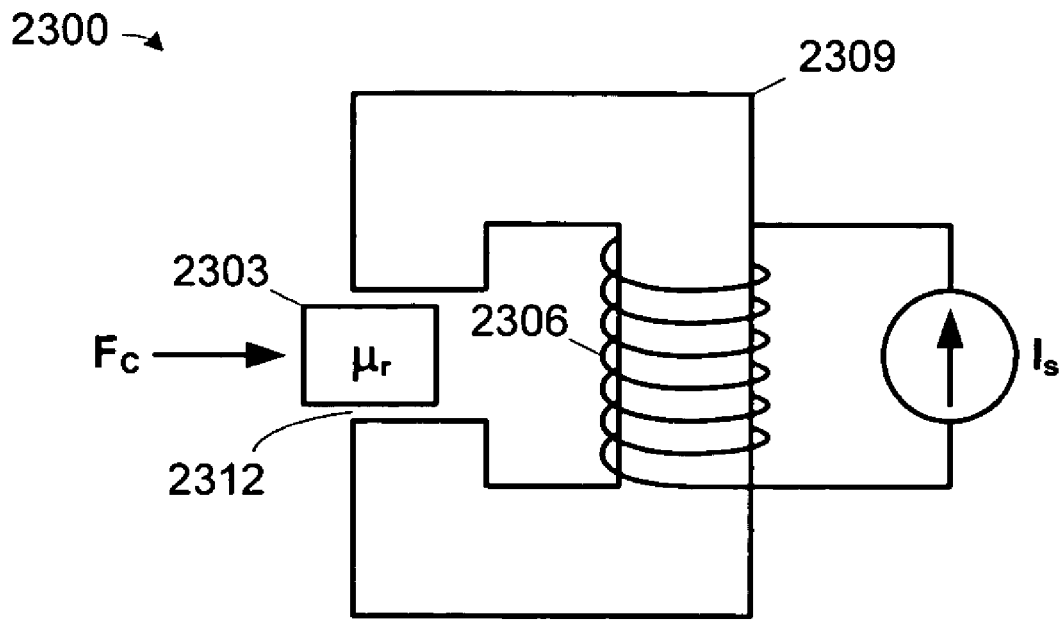
FIG. 23 depicts an electromagnetic apparatus.
Figure 24:
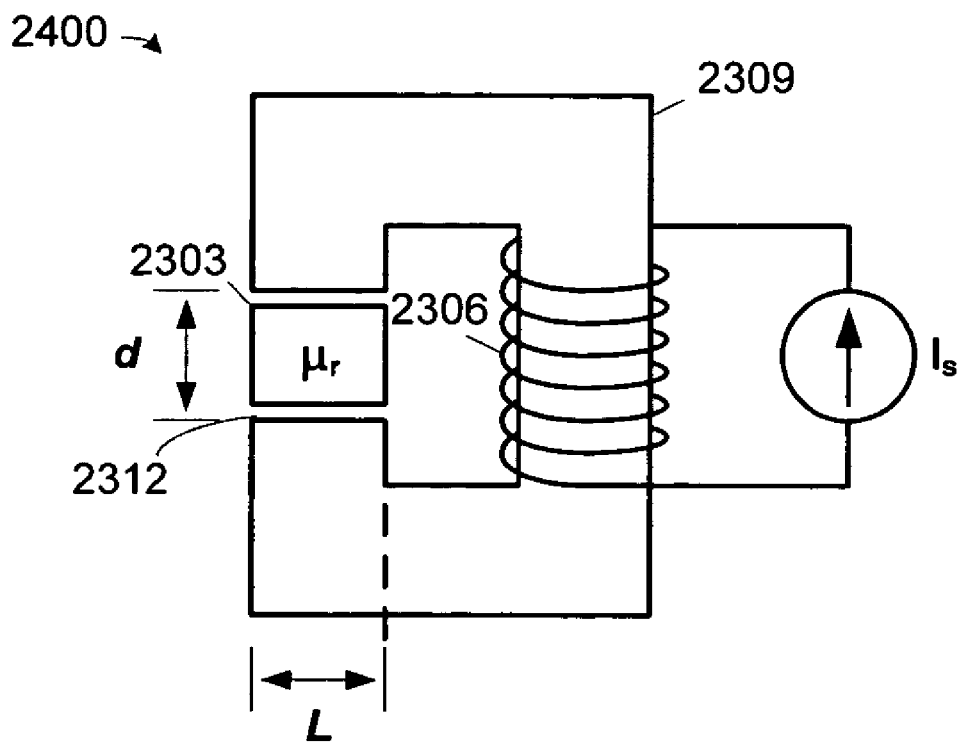
FIG. 24 illustrates the centering of a ferrite plate in a gap of the electromagnetic apparatus of FIG. 23.

Now consider the electromagnetic apparatus 2300 of FIG. 23, in which the centering force $F_C$ exerted on a ferrite plate 2303 is illustrated. In this apparatus 2300, a constant current $I_s$ is passed through a solenoid 2306 wound around a ferrite core 2309. This ferrite core 2309 has a gap 2312 into which a ferrite plate 2303 is inserted. There will be a force on the plate 2303 causing it to become centered in the gap 2312 as shown in FIG. 24.

As shown in FIG. 23, the centering force, $F_C$, exerted on the plate 2303 can be determined. In this example, the ferrite plate 2303 is assumed to have a relative permeability of $\mu_r$; and, the relative permeability of the void space surrounding the plate 2303 is assumed to be that of free space or 1

The energy stored in this solenoid 2306 is:

$$E_L = 0.5 L I^2 \quad (27)$$

where:
$E_L$=the energy stored in the inductor or solenoid;
L=the inductance; and
I=the inductor current.

So for the case of an electromagnetic sensor, the result for the centering force $F_C$ is similar to that of Eq. (26) as follows:

$$F_C = L^{-1}(E_{L2} - E_{L2}) \quad (28)$$

where $E_{L1}$ and $E_{L2}$ correspond to the energy stored in the inductor for the two states.

Substituting Eq. (27) into Eq. (28) provides the force as a function of inductance change for the apparatus 2400 of FIG. 24.

$$F_C = \frac{I_s^2}{2L}(L_2 - L_1) \quad (29)$$

where:
$F_C$=recentering force;
$L_1$ and $L_2$=the inductances for the two states;
$I_s$=the inductor current; and
L=the length of the gap parallel to the direction of the force.
The inductance, L, of a gapped core is defined as:

$$L = \frac{0.4\pi N^2 A_C 10^{-8}}{d + \frac{d_m}{\mu_m}} \quad (30)$$

where:
L=the inductance;
N=number of turns;
$A_C$=magnetic core cross-sectional area;
d=length of the remaining magnetic gap of cross-section $A_C$;
$d_m$=magnetic path length of the ferrite core material;
$\mu_m$=relative permeability of the ferrite core material
Eq. (30) is suitable for calculation of the inductances for the two states where the ferrite plate 2303 is completely removed from the gap 2312 and when it is centered in the gap 2312. For the state where the plate 2303 is centered in the gap 2312 it is assumed that the permeability of the plate 2303 is equal to that of the ferrite core 2309 and that some minimal gap 2312 still exists even when the plate 2303 is centered.

In this application it is assumed that the cross-sectional area of the magnetic core 2309 and the gap 2312 are the same, $A_C$. For consistency, the cross-sectional area of the gap 2312 has been defined previously as b×L. Substituting Eq. (30) into Eq. (29) and substituting for the cross-sectional area provides the force as a function of the gap 2312 and the magnetic path length for the apparatus 2400 of FIG. 24.

$$F_C = \frac{0.4\pi N^2 I_s^2 b 10^{-8}}{2}\left[\left(d_2 + \frac{d_{m2}}{\mu_m}\right)^{-1} - \left(d + \frac{d_{m1}}{\mu_m}\right)^{-1}\right] \quad (31)$$

where:
$F_C$=centering force;
$d_2$=gap remaining when the plate is fully inserted;
$d_{m2}$=combined magnetic path length of the core and plate;
d=gap with no plate inserted into the apparatus; and
$d_{m1}$=magnetic path length of only the ferrite core material.
An electromagnetic accelerometer will now be disclosed. The electromagnetic accelerometer 2500 of FIG. 25, which is a simplified view of an electromagnetic accelerometer, is one embodiment of the invention. Its operation is similar to that of the dielectric accelerometer previously disclosed in that the particles 2503 (only one indicated) are placed in motion between the two magnetic gaps 2506 associated with the circuit if SW1 and SW2 and the ferrite magnetic circuits M1 and M2.

Figure 25:
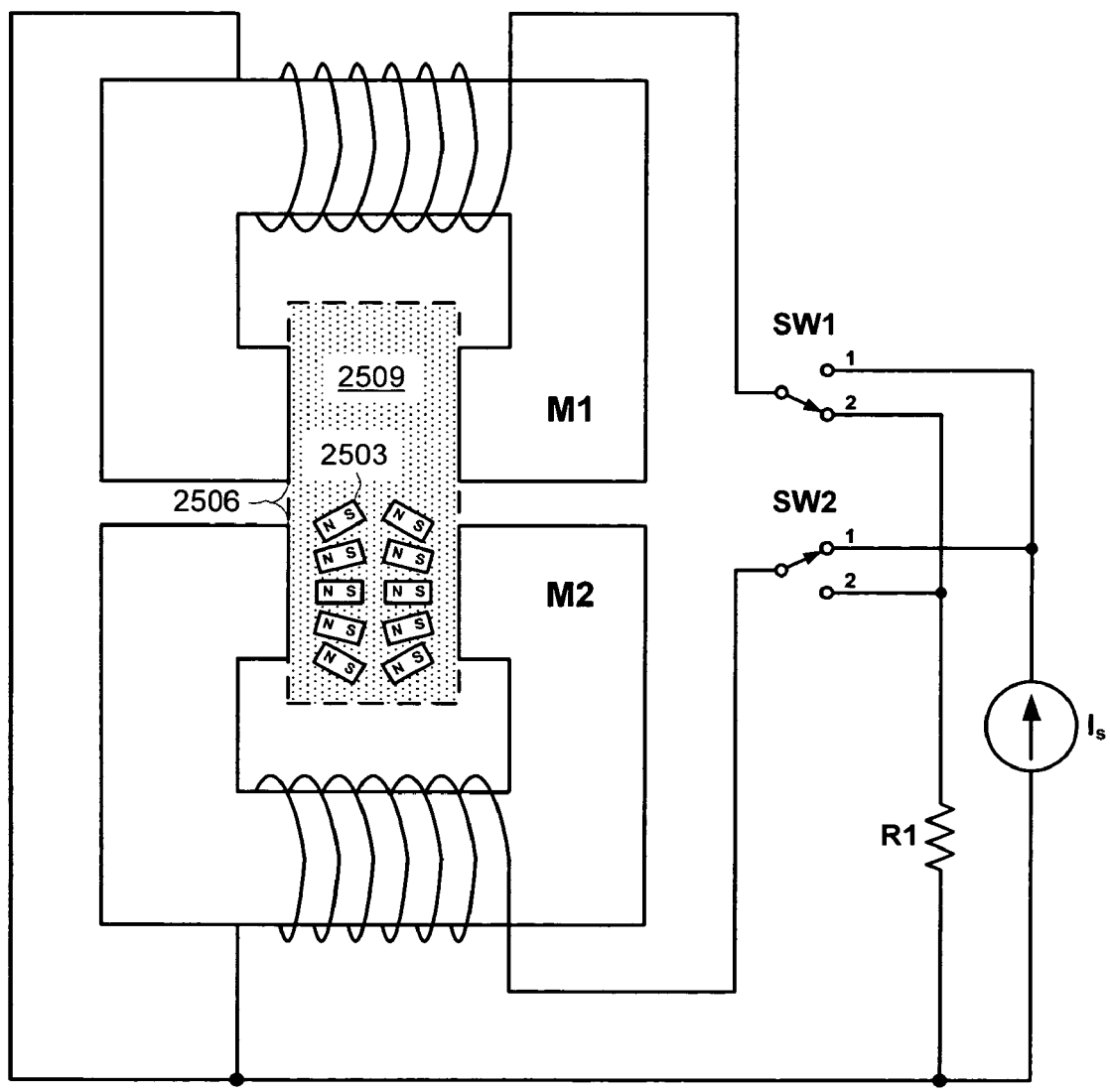
FIG. 25 depicts one particular embodiment of the electromagnetic apparatus of FIG. 23.

In FIG. 25, the M2 circuit is activated and attracts high permeability ferrite particles 2503 into the gap 2506 associated with the M2 circuit. These particles 2503 are suspended in a low permeability fluid 2509.

As with the dielectric accelerometer, the switches SW1, SW2 are controlled so as to move the high dielectric particles 2503 back and forth between the gaps 2506 associated with the two magnetic circuits M1, M2. When one magnetic circuit M1, M2 is being activated, the other is discharged through the resistor, R1. This discharge time constant or energy is used to measure the inductance of the discharged circuit much in the same way as the discharge time constant or energy is measured by the dielectric accelerometer electronics.

In comparing Eq. (24) and Eq. (31) it can be seen that the electromagnetic accelerometer 2500 is also similar to the dielectric accelerometer in that the volume of low permeability (or low relative dielectric) material defines the force generated by the apparatus. That being said, the equation defining the centering force as a function of the volume percentage of high permeability particles can be determined in the same way it was determined for the dielectric accelerometer in Eq. (24).

Referring to Eq. (31) the value:

$$\left(d_2 + \frac{d_{m2}}{\mu_m}\right)^{-1}$$

corresponds to the condition shown in FIG. 25 and associated with the M2 circuit where the high permeability particles 2503 are centered in the gap 2506. As with the dielectric accelerometer, $d_2$ is assumed to be large relative to the value $$\frac{d_{m2}}{\mu_2}$$

therefore this value becomes $d_2^{-1}$.

The value:

$$\left(d + \frac{d_{m1}}{\mu_m}\right)^{-1}$$

corresponds to the condition shown in FIG. 25 and associated with the M1 circuit where there is only low permeability fluid 2509 in the area of the gap 2506. Similarly, d is assumed to be large relative to the value $$\frac{d_{m1}}{\mu_m}$$

therefore this value becomes $d^{-1}$.

Substituting these simplifications into Eq. (31) yields:

$$F_C = \frac{0.4\pi N^2 I_s^2 10^{-8} b}{2}(d_2^{-1} - d^{-1}) \quad (32)$$

where:
  $d_2$=the effective gap when all particles are in the gap; and
  d=the dielectric when no particles are in the gap.

As with the dielectric accelerometer for the $d_2$ case all of the high permeability particles 2503 will be in one of the gaps 2506 and not the other. That being the case, then the percentage of volume of the high permeability particles 2503 when all of the material is in the gap 2506 is given in Eq. (8) as, $v_2$ and:

$$v_2 = \frac{d_2}{d} \quad (33)$$

Combining Eq. (32) and Eq. (33), the force equation as a function of the volume percentage of high permeability material becomes:

$$F_C = \frac{0.4\pi N^2 I_s^2 10^{-8} b}{2d}\left[\frac{v_2}{1-v_2}\right] \quad (34)$$

Thus, in accordance with one aspect, the invention includes an apparatus, comprising: a fluid container; a fluid mixture disposed within the fluid container, the fluid mixture including at least two components having different relative permeabilities; means for imparting an electromagnetic force across the fluid mixture to cause at least one of the components to be placed in motion; and means for controlling the electromagnetic force to counteract the effects of an applied acceleration. In one embodiment, the imparting means comprises a pair of electrode plates oriented so that, when energized with an electric potential, causes at least one of the dielectric components to be placed in motion. In this embodiment, the electrodynamic force is the electric potential. In a second embodiment, the imparting means comprises a pair of wound ferrite cores oriented so that, when energized with an electric current, causes at least one of the components to be placed in motion. In this particular embodiment, the electrodynamic force is associated with the magnetic field and produced by the electric current in the circuit.

This concludes the detailed description. The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. An apparatus, comprising:
    a fluid container;
    a dielectric fluid mixture disposed within the fluid container, the dielectric fluid mixture including at least two dielectric components having different relative dielectrics;
    a pair of electrode plates oriented so that, when energized with an electric potential, causes at least one of the dielectric components to be placed in motion; and
    means for controlling the electric potential to counteract the effects of an applied acceleration.

2. The apparatus of claim 1, wherein at least one of the dielectric components is placed in motion upon being subjected to an acceleration.

3. The apparatus of claim 1, wherein the controlling means comprises a voltage control block.

4. An accelerometer, comprising:
    a voltage source; and
    a fixture electrically connected to the voltage source, the fixture including:
        a fluid container;
        a low dielectric fluid disposed within the fluid container;
        a high dielectric element suspended in the fluid; and
        a pair of electrode plates that can be charged by the voltage source through the electrical connection to center the high dielectric element therebetween at least until an acceleration is applied.

5. The accelerometer of claim 4, wherein the fluid has a relative dielectric constant of nearly 1.

6. The accelerometer of claim 4, wherein the fluid comprises at least one of alcohol and silicone oil.

7. The accelerometer of claim 4, wherein the high dielectric element comprises at least one of a fluid and a solid.

8. The accelerometer of claim 7, wherein the solid, high dielectric element comprises at least one of a distributed solid and a unitary solid.

9. The accelerometer of claim 8, wherein the distributed, solid, high dielectric element comprises a plurality of ceramic beads.

10. The accelerometer of claim 4, wherein the high dielectric element comprises at least one of a distributed high dielectric element and a unitary high dielectric element.

11. The accelerometer of claim 4, wherein the fixture includes a second pair of electrode plates that can be charged by the voltage source alternately with the first pair through the electrical connection to center the high dielectric element therebetween at least until an acceleration is applied.

12. The accelerometer of claim 11, further comprising a voltage control block capable of controlling electrode plate voltages to counteract the effects of an applied acceleration.

13. The accelerometer of claim 11, further comprising:
an integrated circuit capable of determining a differential voltage across the first and second pairs of electrode plates; and
an integrated circuit capable of averaging the differential voltage over time.

14. The accelerometer of claim 4, further comprising a second pair of electrode plates that can be charged by the voltage source through the electrical connection to center the high dielectric element therebetween at least until the acceleration is applied.

15. An apparatus, comprising a plurality of sensors oriented to measure acceleration in a plurality of axes, each sensor comprising:
a housing;
a wafer disposed with the housing and including an electrical connection; and
a plurality of cells in the wafer, each cell comprising a fixture including:
a fluid container defining a fluid chamber;
a non-conducting, low dielectric fluid disposed within the fluid chamber;
a high dielectric element suspended in the fluid; and
a pair of electrode plates that can be charged by a voltage source through the electrical connection to center the high dielectric element therebetween at least until an acceleration is applied.

16. The apparatus of claim 15, wherein the fluid has a relative dielectric constant of nearly 1.

17. The apparatus of claim 15, wherein the fluid comprises at least one of alcohol and silicone oil.

18. The apparatus of claim 15, wherein the high dielectric element comprises at least one of a fluid and a solid.

19. The apparatus of claim 15, wherein the high dielectric element comprises at least one of a distributed high dielectric element and a unitary high dielectric element.

20. The apparatus of claim 15, wherein the fixture includes a second pair of electrode plates that can be charged by the voltage source alternately with the first pair through the electrical connection to center the high dielectric element therebetween at least until an acceleration is applied.

21. The apparatus of claim 15, wherein the fixture further includes a second pair of electrode plates that can be charged by the voltage source through the electrical connection to center the high dielectric element therebetween at least until the acceleration is applied.

22. A method for measuring acceleration, comprising:
positioning a high dielectric element suspended in a low dielectric fluid contained between a pair of charged electrode plates;
determining a change in capacitance across the charged electrode plates as an acceleration is applied; and
determining from the capacitance change a magnitude of the acceleration.

23. The method of claim 22, wherein positioning the high dielectric element includes centering the high dielectric element between the charged electrode plates.

24. The method of claim 22, wherein determining from the capacitance change the magnitude of the acceleration includes determining the magnitude of the acceleration from a rate of change of the capacitance.

25. The method of claim 22, further comprising charging a second pair of electrode plates alternately with the first pair of electrode plates to position the high dielectric element therebetween alternately with the positioning the high dielectric element between the first pair of charged electrode plates.

26. The method of claim 25, wherein determining from the capacitance change the magnitude of the acceleration includes determining the magnitude of the acceleration from a rate of change of the capacitance.

27. The method of claim 22, further comprising controlling the plate potential of the pair of charged plate electrodes to counteract the effects of the acceleration.

28. The method of claim 22, wherein positioning the high dielectric element, includes positioning a solid dielectric element or positioning a fluid dielectric element.

29. The method of claim 22, wherein positioning the high dielectric element includes positioning a unitary dielectric element or positioning a distributed dielectric element.

30. An apparatus, comprising:
a fluid container;
a fluid mixture disposed within the fluid container, the fluid mixture including at least two components having different relative permeabilities;
means for imparting an electromagnetic force across the fluid mixture to cause at least one of the components to be placed in motion; and
means for controlling the electromagnetic force to counteract the effects of an applied acceleration, the means including a pair of magnetic gaps oriented so that, when energized with a magnetic field, causes at least one of the components to be placed in motion.

31. The apparatus of claim 30, wherein the electromagnetic force is the effect of the electric potential.

32. The apparatus of claim 30, wherein the imparting means comprises a pair of wound ferrite cores oriented so that, when energized with an electric current, causes at least one of the components to be placed in motion.

33. The apparatus of claim 30, wherein the electromagnetic force is the effect of the electric current.

* * * * *